(12) United States Patent  
Ii et al.

(10) Patent No.: US 9,359,505 B2
(45) Date of Patent: Jun. 7, 2016

(54) GAS BARRIER FILM, PROCESS FOR PRODUCTION OF GAS BARRIER FILM, AND ELECTRONIC DEVICE

(75) Inventors: Hiromoto Ii, Tokyo (JP); Satoshi Ito, Tokyo (JP); Makoto Honda, Tokyo (JP); Kiyoshi Oishi, Tokyo (JP); Issei Suzuki, Tokyo (JP)

(73) Assignee: KONICA MINOLTA HOLDINGS, INC., Tokyo (JP)

( * ) Notice: Subject to any disclaimer, the term of this patent is extended or adjusted under 35 U.S.C. 154(b) by 0 days.

(21) Appl. No.: 13/810,544

(22) PCT Filed: Jul. 7, 2011

(86) PCT No.: PCT/JP2011/065568
§ 371 (c)(1),
(2), (4) Date: Jan. 16, 2013

(87) PCT Pub. No.: WO2012/014653
PCT Pub. Date: Feb. 2, 2012

(65) Prior Publication Data
US 2013/0115423 A1    May 9, 2013

(30) Foreign Application Priority Data

Jul. 27, 2010  (JP) .................. 2010-167914
Nov. 18, 2010 (JP) .................. 2010-257660
Dec. 22, 2010 (JP) .................. 2010-285519
Jan. 13, 2011  (JP) .................. 2011-004588

(51) Int. Cl.
*C09D 1/00* (2006.01)
*B05D 5/00* (2006.01)
(Continued)

(52) U.S. Cl.
CPC .. *C09D 1/00* (2013.01); *B05D 5/00* (2013.01); *C08J 7/045* (2013.01); *C08J 7/123* (2013.01);
(Continued)

(58) Field of Classification Search
None
See application file for complete search history.

(56) References Cited

U.S. PATENT DOCUMENTS

2006/0251905 A1* 11/2006 Arakawa .................. 428/429
2007/0145354 A1*  6/2007 Birau et al. ............... 257/40
(Continued)

FOREIGN PATENT DOCUMENTS

CN    102470637    5/2012
EP    2 455 220    5/2012
(Continued)

OTHER PUBLICATIONS

European Extended Search Report dated Feb. 17, 2014.
(Continued)

*Primary Examiner* — Ronak Patel
(74) *Attorney, Agent, or Firm* — Lucas & Mercanti, LLP

(57) ABSTRACT

The present invention provides a gas barrier film having high barrier properties, folding/bending resistance and smoothness and excellent cutting suitability, and also provides an organic photoelectric conversion element equipped with the gas barrier film. The gas barrier film is characterized by having a gas barrier layer unit (5) on a side face of at least one surface of a base material (2), wherein the gas barrier layer unit (5) comprises a first barrier layer (3) formed by a chemical vapor deposition method and a second barrier layer (4) formed by applying a silicon compound onto the first barrier layer (3) to form a coating film and modifying the coating film, and wherein the second barrier layer (4) has an unmodified region (4B) on a side facing the base material and a modified region (4A) on a side facing the front layer of the film.

25 Claims, 2 Drawing Sheets

(51) Int. Cl.
*C08J 7/12* (2006.01)
*C08J 7/04* (2006.01)

(52) U.S. Cl.
CPC .......... *C08J 2323/06* (2013.01); *C08J 2483/16* (2013.01); *Y10T 428/2495* (2015.01); *Y10T 428/24355* (2015.01); *Y10T 428/24942* (2015.01); *Y10T 428/24975* (2015.01); *Y10T 428/24992* (2015.01)

(56) References Cited

U.S. PATENT DOCUMENTS

| | | | |
|---|---|---|---|
| 2008/0095999 A1* | 4/2008 | Yoshihara et al. | 428/220 |
| 2009/0167164 A1* | 7/2009 | Fukuda et al. | 313/504 |
| 2011/0086220 A1* | 4/2011 | Yoshida et al. | 428/317.5 |
| 2011/0185948 A1* | 8/2011 | Uemura et al. | 106/632 |
| 2011/0317248 A1* | 12/2011 | Lee et al. | 359/296 |

FOREIGN PATENT DOCUMENTS

| | | |
|---|---|---|
| EP | 2 650 121 | 10/2013 |
| JP | 08-286861 | 11/1996 |
| JP | 09-070917 | 3/1997 |
| JP | 11-151774 | 6/1999 |
| JP | 2003-118030 | 4/2003 |
| JP | 2008-235165 | 10/2008 |
| JP | 2009-286041 | 10/2009 |
| JP | 2009-255040 | 11/2009 |
| JP | 2010-000447 | 1/2010 |
| WO | WO 2009/139391 * | 11/2009 |
| WO | WO 2010/024378 * | 3/2010 |
| WO | 2011/007543 | 1/2011 |

OTHER PUBLICATIONS

Chinese Office Action, Application No. 201180036153.6, Mailing Date: Feb. 28, 2014 (6 pages).
English translation of Chinese Office Action, Application No. 201180036153.6, Mailing Date: Feb. 28, 2014 (7 pages).
Korean Office Action, Notification of Opinion Submission, Application No. 10-2013-7001823, Mailing Date: Feb. 24, 2014 (5 pages).
English translation of Korean Office Action, Notification of Opinion Submission, Application No. 10-2013-7001823, Mailing Date: Feb. 24, 2014 (5 pages).
Journal: Conversion of Perhydropolysilazane into a SiOx Network Triggered by Vacuum Ultraviolet Irradiation: Access to Flexible, Transparent Barrier Coatings (8 pages).
Office Action dated Apr. 28, 2015 for the corresponding Japanese Patent Application No. 2012-526400.
English translation of Office Action dated Apr. 28, 2015 for the corresponding Japanese Patent Application No. 2012-526400.

* cited by examiner

US 9,359,505 B2

GAS BARRIER FILM, PROCESS FOR PRODUCTION OF GAS BARRIER FILM, AND ELECTRONIC DEVICE

CROSS REFERENCE TO RELATED APPLICATION

This Application is a 371 of PCT/JP2011/065568 filed on Jul. 7, 2011 which, in turn, claimed the priorities of Japanese Patent Application Nos. JP2010-167914 filed on Jul. 27, 2010, JP2010-257660 filed Nov. 18, 2010, JP2010-285519 filed Dec. 22, 2010, and JP2011-004588 filed Jan. 13, 2011, all applications are incorporated by reference herein.

TECHNICAL FIELD

The present invention relates to a gas barrier film, its production method and an organic photoelectric conversion element using a gas barrier film. In particular, the present invention relates to a gas barrier film mainly used for packaging an electronic device, for a solar cell, or for a plastic substrate in a display material such as an organic EL element and a liquid crystal, and the present invention relates to its production method and an electronic device which uses a gas barrier film.

BACKGROUND

In the past, a gas barrier film in which a thin layer of a metal oxide such as aluminum oxide, magnesium oxide, or silicon oxide is formed on a plastic substrate or on a film surface has been widely used for packaging of a product which requires a barrier for various types of gases such as water vapor and oxygen as well as for packaging to prevent quality change of, for example, foods, industrial products, or medicinal products. Aside from the use for packaging, a gas barrier film is also used as a substrate for a liquid crystal display, solar cell, and organic electroluminescence (EL), for example.

As a method for producing these gas barrier films, there are mainly known the following methods: a method for producing a gas barrier film with plasma CVD (Chemical Vapor Deposition); a method containing the steps of coating a coating liquid containing mainly polysilazane, then, applying a surface treatment thereon; and a method of combining these two methods (for example, refer to Patent documents 1 to 3).

In the invention described in Patent document 1, it is disclosed that the compatibility of thick film formation for high barrier property and inhibition of cracks is achieved by the lamination forming method, which contains a wet method to form a polysilazane film having a thickness of 250 nm or less, followed by irradiating the formed film with vacuum ultraviolet rays at least two times.

However, by the method described in Patent document 1, it was found that there remained a problem of insufficient flexibility when lamination was only repeated to achieve a higher gas barrier property. In addition, there produced a phenomenon in which the cut edge portion of the film was vigorously broken caused by the stress given during the cutting process of the film. The effective area as a final product was decreased due to the crack of the cut edge of the film. It was newly revealed that a problem of decreased production yield was resulted.

In the invention described in Patent document 2, it is disclosed a method in which polysilazane is laminate-coated on the gas barrier layer formed with a vacuum plasma CVD method, then the gas barrier layer is repaired by carrying out heat treatment to further improve the barrier property. However, the performance as a gas barrier layer for an organic photoelectric conversion element was insufficient. Accordingly, a further improved gas barrier property, for example, a moisture permeating rate notably lower than $1 \times 10^{-2}$ g/m$^2$·day has been desired. Moreover, since the heat treatment of polysilazane requires the conditions of 160° C. for 1 hour, it produced difficulty of the limited application case to thermal resistive resin substrates.

In the invention described in Patent document 3, it is disclosed a method in which polysilazane is coated on a gas barrier layer formed with a vacuum plasma CVD method to make the film smooth, then, a conductive film is formed. By this method, although the compatibility of high barrier property and surface smoothness can be achieved, the stress during bending is concentrated to the gas barrier layer to result in breakdown of the barrier layer due to the unrelieved stress, and a current status is holding a problem of inferior bending property.

PRIOR ART DOCUMENTS

Patent Documents

Patent document 1: JP-A No. 2009-255040
Patent document 2: Japanese registered patent No. 3511325
Patent document 3: JP-A No. 2008-235165

SUMMARY OF THE INVENTION

Problems to be Solved by the Invention

The present invention was achieved in view of the above-described problems, and an object thereof is to provide a gas barrier film which is excellent in barrier property, bending resistance and smoothness, and has an appropriate cutting process aptitude, as well as to provide its production method and an electronic device using this gas barrier film.

An object of the present invention described above has been achieved by the following constitutions.

1. A gas barrier film comprising a substrate and a gas barrier layer unit on at least one surface of the substrate,
   wherein the gas barrier layer unit contains:
   a first barrier layer formed with a chemical vapor deposition method; and
   a second barrier layer formed by coating with a silicon compound on the first barrier layer, followed by applying a reforming treatment thereto,
   the second barrier layer having a non-reformed region at a substrate side and a reformed region at a surface side.
2. The gas barrier film described in the aforesaid item 1,
   wherein a smooth layer is provided between the substrate and the first barrier layer,
   the smooth layer having:
   a pencil hardness of H or more at a side on which the first barrier layer is formed, the pencil hardness being defined in JIS K 5400; and
   a maximum profile height Rt(p) in the range of 10 nm<Rt(p)<30 nm, the maximum profile height being defined in JIS B 0601.
3. The gas barrier film described in the aforesaid item 2,
   wherein the smooth layer contains an inorganic component in an amount of 10 mass % or more based on the total weight of the smooth layer.
4. The gas barrier film described in any one of the aforesaid items 1 to 3, wherein the first barrier layer formed with a chemical vapor deposition method contains silicon oxide, silicon oxynitride, or silicon nitride.

5. The gas barrier film described in any one of the aforesaid items 1 to 4,
   wherein the second barrier layer is formed by coating with a polysilazane containing liquid to form a coated layer, followed by applying a reforming treatment on the coated layer.

6. The gas barrier film described in any one of the aforesaid items 1 to 5,
   wherein a thickness of the reformed region which is located at a surface side of the second barrier layer is 0.2 to 0.9 in a thickness ratio based on the total thickness of the second barrier layer.

7. The gas barrier film described in any one of the aforesaid items 1 to 6,
   wherein the first barrier layer formed with a chemical vapor deposition method contains silicon oxide or silicon oxynitride; and elastic moduli satisfy the relationship of: $E1>E2>E3$, when $E1$ is an elastic modulus of the first barrier layer, $E2$ is an elastic modulus of the reformed region in the second barrier layer, and $E3$ is an elastic modulus of the non-reformed region in the second barrier layer.

8. The gas barrier film described in any one of the aforesaid items 1 to 7,
   wherein film densities satisfy the relationship of: $D1>D2>D3$, when $D1$ is a film density of the first barrier layer, $D2$ is a film density of the reformed region in the second barrier layer; and $D3$ a film density of the non-reformed region in the second barrier layer.

9. The gas barrier film described in the aforesaid item 8,
   wherein a film density difference ($D1-D2$) of the film density $D1$ and the film density $D2$ is from 0.05 to 1.30;
   a film density difference ($D1-D3$) of the film density $D1$ and the film density $D3$ is from 0.15 to 1.40; and
   a film density difference ($D2-D3$) of the film density $D2$ and the film density $D3$ is 0.10 or more.

10. The gas barrier film described in any one of the aforesaid items 1 to 9,
    wherein the first barrier layer contains silicon oxide or silicon oxynitride and has a thickness of 50 nm to 300 nm; and the second barrier layer has a thickness of 60 nm to 600 nm.

11. The gas barrier film described in the aforesaid item 10,
    wherein the first barrier layer has a thickness of 50 nm to 200 nm; and the second barrier layer has a thickness of 60 nm to 300 nm.

12. A method for forming the gas barrier film described in any one of the aforesaid items 1 to 11,
    wherein the reforming treatment applied to the second barrier layer is an irradiating treatment with a vacuum ultraviolet ray having a wavelength component of 180 nm or less.

13. An electronic device using the gas barrier film described in any one of the aforesaid items 1 to 11.

Effects of the Invention

By the present invention, it was possible to provide a gas barrier film which is excellent in barrier property, bending resistance and smoothness, and has an appropriate cutting process aptitude, as well as to provide its production method and an electronic device using this gas barrier film.

EMBODIMENTS TO CARRY OUT THE INVENTION

The embodiments to carry out the present invention will be described in the following.

The present inventors extensively investigated the above-mentioned problems and realized the following gas barrier film. The realized gas barrier film comprises a substrate and a gas barrier layer unit on at least one surface side of the substrate, wherein the gas barrier layer unit contains: a first barrier layer formed with a chemical vapor deposition method; and a second barrier layer formed by coating with a silicon compound on the first barrier layer, followed by applying a reforming treatment thereon, the second barrier layer having a non-reformed region at a substrate side and a reformed region at a surface side. This barrier film is excellent in barrier property, bending resistance and smoothness, and has an appropriate cutting process aptitude.

A preferable gas barrier film is provided with a smooth layer between the substrate and the first barrier layer. And the smooth layer has a pencil hardness of H or more at a side on which the first barrier layer is formed; and a maximum profile height Rt(p) in the range of: $10 \text{ nm}<Rt<30 \text{ nm}$. This layer enables to decrease the production of the defect in the first barrier layer due to the stress received during the formation of the second barrier film.

Another preferable embodiment of the present invention is a gas barrier film comprising a substrate and a gas barrier layer unit on at least one surface side of the substrate, wherein the gas barrier layer unit contains: a first barrier layer formed with a chemical vapor deposition method; and a second barrier layer formed by coating with a polysilazane containing liquid to form a coated layer, followed by applying a reforming treatment thereon. By this embodiment, it is possible to realize a gas barrier film more excellent in barrier property, bending resistance and smoothness, and has an appropriate cutting process aptitude.

Figure 1:
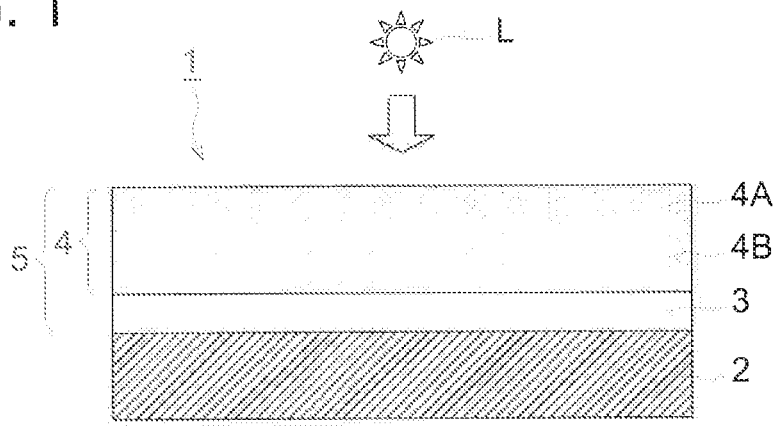
FIG. 1 is a schematic cross-sectional view showing an example of a layer composition of a gas barrier film of the present invention.

In FIG. 1, an example of a layer composition of a gas barrier film of the present invention is shown by a schematic cross-sectional view.

In FIG. 1, a gas barrier film 1 of the present invention has a composition comprising a substrate 2 having thereon a gas barrier unit 5 which contains a first barrier layer 3 formed with a chemical vapor deposition method, and a second barrier layer 4 formed by coating with a polysilazane containing liquid.

The second barrier layer 4 is at first formed on the first barrier layer 3, followed by applying a reforming treatment thereto using a reforming treatment means L such as by irradiation with a vacuum ultraviolet ray having a wavelength component of 180 nm or less.

In the second barrier layer 4 to which has been applied a reforming treatment, reforming progresses in the surface side of the reforming treatment means L, while reforming does not progress or does not occur in the side of the first barrier layer 3. As a result, there are formed a reformed region 4A and a non-reformed region 4B inside of the layer.

In the present invention, after performing a reforming treatment in the second barrier layer 4 it can be confirmed a reformed region 4A and a non-reformed region 4B as follows. With trimming in the depth direction of the second barrier layer 4, there are conducted successive measurements of properties such as density, elastic modulus, and composition ratio (for example, ratio of "x" in $SiO_x$). A bending point in the properties is determined. This point can be used as an interface of a reformed region 4A and a non-reformed region 4B. Further, the following method can be cited as a most effective method. A cross-section of the produced gas barrier film is cut out with a microtome, and the obtained very thin leaf is observed with a transmission electron microscope. In this case, by irradiating an electron beam during the observation, the interface of a reformed region 4A and a non-reformed region 4B will be clearly appear and the location of the interface can be determined. Thus, the thickness of a reformed region 4A and the thickness of a non-reformed region 4B can be easily determined.

In a preferred embodiment of a gas barrier film of the present invention, as illustrated in FIG. 1, it is characterized in containing a first barrier layer 3 formed with a chemical vapor deposition method, and a second barrier layer 4 to which is applied a reforming treatment so as to form a reformed region 4A and a non-reformed region 4B. Between a tight first barrier layer 3 and a reformed region 4A in a second barrier layer 4, a non-reformed region 4B is introduced. By making this structure, it was revealed that it can control the concentration of the stress to a specific layer during the bending and bending and bending resistance is tremendously improved. Thus, the present invention was achieved.

Further, a coating liquid containing a silicon compound to form a second barrier layer 4 of the present invention preferably contains polysilazane as a silicon compound.

Further, a thickness of the reformed region 4A which is formed at a surface side of the second barrier layer 4 is preferably from 0.2 to 0.9 in a thickness ratio based on the total thickness of the second barrier layer 4. More preferably, it is from 0.4 to 0.8.

Moreover, a first barrier layer 3 formed with a chemical vapor deposition method of the present invention contains silicon oxide or silicon oxynitride, and it is preferable that elastic moduli satisfy the relationship of: $E1>E2>E3$, when $E1$ is an elastic modulus of the first barrier layer, $E2$ is an elastic modulus of the reformed region 4A in the second barrier layer 4, and $E3$ is an elastic modulus of the non-reformed region 4B in the second barrier layer 4.

Moreover, it is preferable that film densities satisfy the relationship of: $D1>D2>D3$, when $D1$ is a film density of the first barrier layer 3, $D2$ is a film density of the reformed region 4A in the second barrier layer 4, and $D3$ a film density of the non-reformed region 4B in the second barrier layer 4.

Moreover, it is preferable that a film density difference (D1−D2) of the film density D1 and the film density D2 is from 0.05 to 1.30; a film density difference (D1−D3) of the film density D1 and the film density D3 is from 0.15 to 1.40; and a film density difference (D2−D3) of the film density D2 and the film density D3 is 0.10 or more.

Moreover, it is preferable that the first barrier layer is a layer made of silicon oxide or silicon oxynitride and has a thickness of 50 nm to 300 nm. More preferably, the thickness of the first barrier layer is 50 nm to 200 nm. It is preferable that the second barrier layer has a thickness of 60 nm to 600 nm, more preferably, it is 60 nm to 300 nm.

In a method for forming the gas barrier film of the present invention, it is preferable that the reforming treatment applied to the second barrier layer is an irradiating treatment with a vacuum ultraviolet ray having a wavelength component of 180 nm or less.

An organic photoelectric conversion element of the present invention is characterized in using a gas barrier film of the present invention.

Hereafter, the composing elements of the gas barrier film of the present invention will be detailed.

<<Gas Barrier Film>>

A gas barrier film of the present invention comprises a substrate and a gas barrier layer unit on at least one surface side of the substrate.

A gas barrier layer unit in the present invention indicate a unit containing: a first barrier layer formed with a chemical vapor deposition method; and a second barrier layer formed by coating with a silicon compound such as polysilazane on the first barrier layer, followed by applying a reforming treatment thereto. It is possible to further improve gas barrier properties by making a composition incorporating a plurality of gas barrier layer unit. Further, it may have a composition having a gas barrier layer unit located on both surface sides of the substrate, respectively.

The gas barrier properties of the present invention are: a water vapor permeability (60±0.5° C., and relative humidity (90±2)% RH) of $1 \times 10^{-3}$ g/(m²·24 h) or less, determined based on JIS K 7129-1992; and an oxygen permeability of $1 \times 10^{-3}$ ml/(m²·24 h·atm) or less, determined based on JIS K 7126-1987. (Here, "1 atm" is defined as $1.01325 \times 10^5$ Pa.)

[First Barrier Film]

In the present invention, a first barrier layer is formed with a chemical vapor deposition method.

Generally, as a method for forming a functional thin film, there are roughly cited a physical vapor growing method and a chemical vapor growth method (chemical vapor deposition method). A physical vapor growth method is a method of depositing a thin film of a target substance (for example, carbon film) with a physical technique on a surface of substance in a gas phase. Examples of this method include: a vapor deposition method (resistance heating method, electron beam vapor deposition method, and molecular epitaxy method), an ion plating method, and a sputtering method. On the other hand, a chemical vapor growing method (Chemical Vapor Deposition) is a method of supplying a raw material gas containing a target component for a thin film to deposit a film by a chemical reaction on a substrate surface or in a gas phase. In order to activate a chemical reaction, it is known a method to produce plasma. Known CVD examples include: a thermal CVD method, a catalytic chemical vapor growth method, a photo CVD method, a plasma CVD method, and an atmospheric pressure CVD method. In the present invention, any method can be effectively used, and the present invention is not limited to any particular method. However, from the viewpoint of film forming speed and treatment area, a plasma CVD is preferably used.

Figure 5:
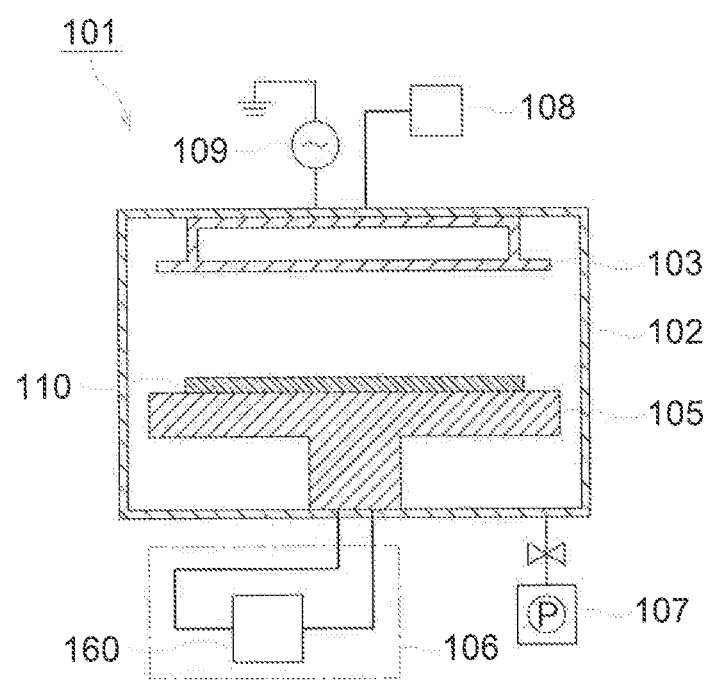
FIG. 5 is a cross-sectional view showing an example of a vacuum plasma CVD apparatus used for forming a first barrier layer of the present invention.

Hereafter, a vacuum CVD method is specifically described be using FIG. 5 as one of plasma CVD methods.

Symbol 101 in FIG. 5 indicates an example of vacuum plasma CVD apparatuses which can be used in the present invention.

This vacuum CVD apparatus is provided a vacuum chamber 102, and a susceptor 105 is arranged at the bottom of the inner portion of the vacuum chamber 102.

At the ceiling of the inner portion of the vacuum chamber 102, a cathode electrode 103 is arranged at the place facing the susceptor 105.

In the exterior portion of the vacuum chamber 102, there are arranged a heat medium circulating system 106, a vacuum evacuation system 107, a gas introducing system 108 and a high frequency power source 109.

Inside of the heat medium circulating system 106, a heat medium is placed.

The heat medium circulating system 106 is provided with: a pump to transfer the heat medium, a heating device to heat the heat medium, a cooling device to cool, a thermal sensor to measure the temperature of the heat medium, and a heating-cooling device 160 equipped with a memory device to memorize the setting temperature of the heat medium.

The heating-cooling device 160 is constructed to measure the temperature of the heat medium, to heat or to cool the heat medium to a memorized setting temperature, and to supply the heat medium to the susceptor 105. The supplied heat medium flows in the susceptor 105, heats or cools the susceptor 105, then, returns to the heating-cooling device 160. At this moment, the temperature of the heat medium becomes higher or lower temperature than the setting temperature, and the heating-cooling device 160 heats or cools the heat medium to the setting temperature, and supplies the heat medium to the susceptor 105. Thus, the cooling medium circulates between the susceptor and the heating-cooling device 160, and the susceptor 105 is heated or cooled with the supplied heat medium having the setting temperature.

A vacuum chamber 102 is connected with a vacuum evacuation system 107. Before starting a film formation treatment with this vacuum plasma CVD apparatus 101, the inside of the vacuum chamber 102 is evacuated and the heat medium is heated from room temperature to a setting temperature and the heat medium with the setting temperature is supplied to a susceptor 105. At the time of starting of usage, the temperature of the susceptor 105 is room temperature, and when the heat medium with the setting temperature is supplied, the temperature of the susceptor 105 is increased.

After circulating the heat medium with the setting temperature for a definite period of time, and with keeping the vacuum state of the inside of the vacuum chamber 102, a substrate 110 to be formed with a film is carried in the vacuum chamber 102, and it is arranged on the susceptor 105.

On a surface of the cathode electrode 103 facing the susceptor 105, there are formed a plurality of nozzles (pores).

The cathode electrode 103 is connected with a gas introducing system 108, and when a CVD gas in introduced from the gas introducing system 108 to the cathode electrode 103, the CVD gas is emitted from the nozzles of the cathode electrode 103 to the inside of the vacuum chamber 102 at a vacuum condition.

The cathode electrode 103 is connected with a high frequency power source 109, and the susceptor 105 and the vacuum chamber 102 are connected to a ground potential.

A CVD gas is introduced from the gas introducing system 108 in of the vacuum chamber 102, and while supplying the heat medium having a prescribed temperature from the heating-cooling device 160 to the susceptor 105, the high frequency power source 109 is driven. When the cathode electrode 103 is impressed with high frequency electric field, there is generated a plasma of the introduced CVD gas.

When the CVD gas activated in the plasma reaches the surface of the substrate 110 on the susceptor 105, a thin film grows on the surface of the substrate 110.

During growth of the thin film, the heat medium having a prescribed temperature is supplied from the heating-cooling device 160 to the susceptor 105. The susceptor 105 is heated or cooled by the heat medium, and the thin film is formed at the condition of keeping at a prescribed temperature. Generally, the lower limit temperature of the growth temperature at the time of forming a thin film is decided from the quality of membrane of the thin film. The upper limit temperature is decided by the tolerable level of the damage of the thin film already formed on the substrate 110.

The lower limit temperature and the upper limit temperature change with the quality of material of a thin film to be formed, and the quality of material of a thin film already formed. When forming a SiN film or a SiON film which is used for a high barrier film, in order to secure the quality of film, the lower limit temperature is 50° C. or less, and the upper limit temperature is below the heat-resistant temperature of a base material.

It is required to determine beforehand the relationship of the film quality of a thin film formed with a plasma CVD method and the film forming temperature, and the relationship of the damage which is received by a film forming subject (a substrate 110) and the film forming temperature. For example, the lower limit temperature of the substrate 110 in a plasma CVD process is 50° C., and the upper limit temperature is 250° C.

Further, the relation between the temperature of the heat medium to be supplied to the susceptor 105 and the temperature of the substrate 110 at the time of forming a plasma by impressing the high frequency voltage of 13.56 MHz or more to the cathode electrode 103 is measured beforehand. In order to maintain the temperature of the substrate 110 to be higher than the lower limit temperature and lower than the upper limit temperature in a plasma CVD process, the temperature of the heat medium supplied to the susceptor 105 is measured.

For example, the lower limit temperature (here, 50° C.) is memorized, and it is set up so that the heat medium which is controlled to have a temperature of more than the lower limit temperature is supplied to the susceptor 105. The heat medium which flows back from the susceptor 105 is heated or cooled, and the heat medium with the preset temperature of 50° C. is provided to the susceptor 105. For example, as a CVD gas, a mixed gas of a silane gas, an ammonia gas, and a nitrogen gas is supplied, and after maintaining the temperature of the substrate 110 to be higher than the lower limit temperature and below the upper limit temperature, an SiN film is formed.

Immediately after starting the plasma CVD apparatus 101, the temperature of the susceptor 105 is room temperature, and the temperature of the heat medium which flows back from the susceptor 105 to the heating-cooling device 160 is lower than the preset temperature. Therefore, immediately after starting, the heat medium which flows back will be heated to the preset temperature by the heating-cooling device 160, and the heat medium will be provided to the susceptor 105. In this case, the susceptor 105 and the substrate 110 are heated with the heat medium to increase the temperature and the temperature of the substrate 110 is maintained to be within the range of between the lower limit temperature and the upper limit temperature.

When a thin film is formed successively on a plurality of the substrates 110, the temperature of the susceptor 105 will be increased by the heat which flows in from plasma. In this case, since the heat medium which flows back to the heating-cooling device 160 from the susceptor 105 becomes high temperature than the lower limit temperature (50° C.), the heating-cooling device 160 cools the heat medium, and the heat medium having the preset temperature is provided to the susceptor 105. Thereby, a thin film can be formed with maintaining the substrate 110 to be within the range of between the lower limit temperature and the upper limit temperature.

Thus, the heating-cooling device 160 will heat the heat medium when the temperature of the flowed back heat medium is below the preset temperature, and will cool the heat medium when the temperature thereof is higher than the preset temperature. In any case, the heat medium of the preset temperature is provided to the susceptor, and, as a result, the temperature of the substrate 110 is maintained to be within the range of between the lower limit temperature and the upper limit temperature.

When a thin film is formed to have a predetermined coating thickness, the substrate 110 is taken out to the exterior of the vacuum chamber 102, and another substrate 110 which is not formed a film thereon is transferred in the vacuum chamber 102, and a thin film is formed in the same manner as described above, with providing the heat medium having the preset temperature.

As mentioned above, although it was given an example of the formation method of the first barrier layer by a vacuum plasma CVD method, as the formation method of the first barrier layer, an atmospheric pressure plasma CVD method which does not need a vacuum can also be used.

An atmospheric pressure plasma CVD method, which performs a plasma CVD process near the atmospheric pressure, does not require a reduced pressure in contrast with a vacuum plasma CVD method. Not only its production efficiency is high, but its film forming speed is high since a plasma density is high. Further, compared with a condition of a conventional CVD method, under a high-pressure of an atmospheric pressure, since an average free path of a gas is very short, it can obtain an extremely homogeneous film.

When an atmospheric pressure plasma treatment is carried out, it is used a nitrogen gas or elements of group 18 in the periodic table as a discharge gas. Specifically, it is used: helium, neon, argon, krypton, xenon or radon. Of these, nitrogen, helium and argon are preferably used, and, specifically, nitrogen is most preferably used also in view of the low cost.

<Atmospheric Pressure Plasma Treatment Provided with Two or More Electric Fields Having a Different Frequency>

Next, a preferable embodiment of an atmospheric pressure plasma treatment will be described. Concretely, as disclosed in WO 2007/026545 pamphlet, it is preferable that two or more electric fields having different frequencies are applied to the discharge space by applying an electric field obtained by superposing a first high frequency electric field and a second high frequency electric field.

The frequency of the second high frequency electric field $\omega 2$ is higher than the frequency of the first high frequency electric field $\omega 1$, the relationship among the strength of the first high frequency electric field V1, the strength of the second high frequency electric field V2 and the strength of the discharge initiating electric field IV meets $$V1 \geq IV > V2 \text{ or } V1 > IV \geq V2,$$

and the power density of the second high frequency electric field is 1 W/cm² or more.

By employing such an electric discharge condition, for example, even nitrogen gas having a high discharge initiating electric field can initiate discharge, a high density and stable plasma state can be maintained, and highly efficient thin film formation can be carried out.

When nitrogen is used as a discharge gas by the above-mentioned measurement, the strength of an discharge initiating electric field IV (½$V_{p-p}$) is around 3.7 kV/mm. Nitrogen gas is excited to cause a plasma state by applying an electric field of which the strength of the first high frequency electric field meets $V1 \geq 3.7$ kV/mm in the above-mentioned relationship.

Here, as the frequency of the first power source, 200 kHz or less is preferably used. Further, the wave shape of the electric field may be a continuous wave or a pulse wave. The lower limit is preferably 1 kHz or less.

On the other hand, as the frequency of the first power source, 800 kHz or more is preferably used. The higher the frequency of the second power source is, the higher the density of the plasma is, whereby a dense and high quality thin film can be obtained. The higher limit is preferably around 200 MHz.

Regarding application of high frequency electric fields from such two power sources, the first high frequency electric field is necessary to start the electric discharge of a discharge gas which require a high strength of discharge initiating electric field, and a dense and high quality thin film can be obtained due to a high plasma density caused by the high frequency and the high power density of the second high frequency electric field.

An atmospheric pressure or a near atmospheric pressure as used in the present invention indicates a pressure of about 20 kPa to 110 kPa. In order to obtain a preferable effect as described in the present invention, it is preferable to be 93 kPa to 104 kPa.

Further, an excited gas as used in the present invention means that at least a part of a gas shifts from the present state to a higher energy state by acquiring energy. An excited gas molecule, a radicalized gas molecule, and an ionized gas molecule correspond to this.

A first barrier layer relating to the present invention is formed as follows. In a discharge chamber at an atmospheric pressure or a near atmospheric pressure is introduce a raw material gas containing a silicon atom mixed with an excited discharge gas to form a second excited gas, then, the substrate is exposed to the formed second excited gas to form an inorganic film.

That is, in the first step, the space between the opposite electrodes (discharge space) is controlled to be an atmospheric pressure or a near atmospheric pressure, and a discharge gas is introduced in the space between the opposite electrodes. Then, a high frequency electric filed is impressed to the space between the opposite electrodes to make the discharge gas in a plasma state. Subsequently, the discharge gas in a plasma state and a raw material gas are mixed outside the discharge space, and this mixed gas (a second excited gas) is exposed to a substrate to result in forming a first barrier layer on the substrate.

A first barrier layer formed with a chemical vapor deposition method as described in the present invention can be selected from a metal oxide, a metal nitride, a metal carbide and their mixed compound. In addition, the first barrier layer is preferable to be essentially or solely made as an inorganic layer. In particular, from the viewpoint of transparency, it is preferable that the first barrier layer contains silicon oxide, silicon oxynitride, or silicon nitride.

[Second Barrier Layer]
(Formation of a Second Barrier Layer by a Coating Liquid Containing a Silicon Compound)

A second barrier layer relating to the present invention is formed by coating a coating liquid containing a silicon compound on the first barrier layer formed with a chemical vapor deposition method.

As a coating method of the layer, an appropriate method may be arbitrarily adopted. Specific examples of a coating method include a spin coat method, a roll coat method, a flow coat method, an inkjet method, a spray coat method, a printing method, a dip coat method, a casting film forming method, a bar coat method and a gravure printing method. The coating thickness may be appropriately set up according to the purpose. For example, the coating thickness may be set up so that the thickness after dried is preferably 1 nm-100 µm, more preferably 10 nm-10 µm and the most preferably 10 nm-1 µm.

A second barrier layer relating to the present invention is formed by coating a coating liquid containing a silicon compound on the first barrier layer formed with a chemical vapor deposition method.

(Silicon Compounds)

A silicon compound according to the present invention is not specifically limited as long as preparation of a coating solution containing a silicon compound is possible. However, it is preferable to use a polysilazane compound or a polysiloxane compound.

Examples of a silicon compound according to the present invention include: perhydropolysilazane, silsesquioxane, tetramethylsilane, trimethylmethoxysilane, dimethyldimethoxysilane, methyltrimethoxysilane, trimethylethoxysilane, dimethyldiethoxysilane, methyltriethoxysilane, tetramethoxysilane, tetraethoxysilane, hexamethyldisiloxane, hexamethyldisilazane, 1,1-dimethyl-1-silacyclobutane, trimethyl vinyl silane, methoxy dimethyl vinyl silane, trimethoxy vinyl silane, ethyl trimethoxy silane, dimethyl divinyl silane, dimethyl ethoxyethynyl silane, diacetoxy dimethyl silane, dimethoxymethyl-3,3,3-trifluoropropylsilane, 3,3,3-trifluoropropyl trimethoxysilane, allyl trimethoxysilane, ethoxy dimethyl vinyl silane, allyl aminotrimethoxysilane, N-methyl-N-trimethylsilyl acetamide, 3-aminopropyl trimethoxysilane, methyl trivinyl silane, diacetoxymethyl vinyl silane, methyltriacetoxy silane, allyoxydimethyl vinyl silane, diethyl vinyl silane, butyl trimethoxysilane, 3-aminopropyl dimethylethoxysilane, tetravinyl silane, triacetoxy vinyl silane, tetraacetoxy silane, 3-trifluoroacetoxypropyl trimethoxysilane, diallyl dimethoxysilane, butyldimethoxy vinyl silane, trimethyl-3-vinyl thiopropylsilane, phenyl trimethylsilane, dimethoxy methylphneylsilane, phenyltrimethoxysilane, 3-acryloxypropyl dimethoxymethylsilane, 3-acryloxypropyl trimethoxysilane, dimethyl isopentyl vinyl silane, 2-allyloxyethyl thiomethoxy trimethylsilane, 3-glycidoxypropyl trimethoxysilane, 3-allylaminopropyl trimethoxysilane, hexyl trimethoxysilane, heptadecafluorodecyl trimethoxysilane, dimethyl ethoxyohenylsilane, benzolyoxy trimethylsilane, 3-methacryloxypropyl diimethoxymethyl silane, 3-methacryloxypropyl trimethoxysilane, 3-iso-cyanate propyl triethoxysilane, dimethylethoxy-3-glycidoxypropylsilane, dibutoxy dimetnylsilane, 3-butylaminopropyl trimethylsilane 3-dimethylaminopropyl diethoxymethylsilane, 2-(2-aminoethylthioethyl)triethoxysilane, bis(butylamino) dimethylsilane, divinylmethyl phneylsilane, Diacetoxymethyl phenylsilane, dimethyl-p-tolyl vinyl silane, p-styrylmethoxysilane, diethylmethylphenylsilane, menzyldimethylethoxysilane, diethoxymethylphenylsilane, decylmethyldimethoxysilane, diethyxy-3-glycidoxypropylmethylsilane, octyloxytrimethylsilane, phenyltrivinyl silane, tetra-allyoxysilane, dodecyltrimethylsilane, diallylmethylphneylsilane, diphenylmethyl vinyl silane, diphenylethoxymethylsilane, diacetoxydiphenylsilane, dibenzylmethylsilane, Gia Lille diallyldiphenylsilane, octadecyltrimethylsilane, methyloctadecyldimethylsilane, dococylmethyldimethylsilane, 1,3-divinyl-1,1,3,3-tetramethyl disiloxane, 1,3-divinyl-1,1,3,3-tetramethyl disilazane, 1,4 bis(dimethylvinylsilyl)benzene, 1,3-bis(3-acetoxyprppyl) tetramethyl disiloxane, 1,3,5-trimethyl-1,3,5-trivinyl cyclotrisiloxane, 1,3,5-tris(3,3,3-trifluoropropyl)-1,3,5-trimethyl cyclotrisiloxane, octamethyl cyclotetrasiloxane, 1,3,5,7-tetraethoxy-1,3,5,7-tetramethyl cyclotetrasiloxane, and decamethyl cyclopentasiloxane.

Examples of silsesquioxane include products supplied as Mayaterials Q8 series such as: Octakis(tetramethylammonium)pentacyclo-octasiloxane-octakis(yloxide)hydrate; Octa (tetramethylammonium)silsesquioxane, Octakis(dimethylsiloxy)octasilsesquioxane, Octa[[3-[(3-ethyl-3-oxetanyl) methoxy]propyl]dimethylsiloxy]octasilsesquioxane; octaallyloxetane silsesquioxane, Octa[(3-Propylglycidylether)dimethylsiloxy]silsesquioxane, Octakis[[3-(2,3-epoxypropoxy)propyl]dimethylsiloxy]octasilsesquioxane; Octakis[[2-(3,4-epoxycyclohexyl)ethyl]dimethylsiloxy]octasilsesquioxane, Octakis[2-(vinyl)dimethylsiloxy]silsesquioxane; Octakis(dimethylvinylsiloxy)octasilsesquioxane, Octakis[(3-hydroxypropyl)dimethylsiloxy]octasilsesquioxane, Octa[(methacryloylpropyl)dimethylsilyloxy]silsesquioxane, Octakis[(3-methacryloxypropyl)dimethylsiloxy]octasilsesquioxane, and hydrogenatesilsesquioxane containing no organic group.

Among silicon compounds, preferable is an inorganic silicon compound. In particular, preferable is a silicon compound being a solid state at a normal temperature. Preferably used are perhydropolysilazane and hydrogenated silsesquioxane.

"Polysilazane" as used in the present invention is a polymer having a silicon-nitrogen bond and a ceramic precursor inorganic polymer such as: $SiO_2$, $Si_3N_4$ and an intermediate solid solution of $SiO_xN_y$ containing Si—N, Si—H and N—H.

In order to coat the coating liquid without deteriorating the film substrate, it is preferable a compound which is converted to ceramic to be silica at a relatively low temperature. It is preferable a compound having a main frame composed of a unit represented by the following Formula (1) as described in JP-A No. 8-112879, for example.

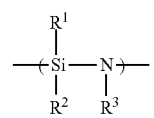

Formula (1)

In the above-described Formula (1), $R^1$, $R^2$ and $R^3$ each respectively represent a hydrogen atom, an alkyl group, an alkenyl group, a cycloalkyl group, an aryl group, an alkylsilyl group, an alkylamino group or an alkoxyl group.

In the present invention, from the viewpoint of tightness of a produced second barrier layer, it is particularly preferable to use the aforesaid perhydropolysilazane having $R^1$, $R^2$ and $R^3$ all being a hydrogen atom.

On the other hand, an organopolysilazane, which has a structure of substituting a part of hydrogen atoms with an alkyl group, will improve adhesiveness with the underlying substrate by having an alkyl group such as a methyl group.

And it can give tenacity to a ceramic film made of stiff and breakable polysilazane. It has a merit of decreasing of crack generation even when the (average) film thickness is increased. According to an application, one of these perhydropolysilazane and organopolysilazane may be selected and they may be used in combination.

Perhydropolysilazane is presumed to have a ring structure containing a straight chain, and a ring structure mainly composed of a 6- and a 8-membered ring. Its molecular weight is about 600-2,000 (polystyrene conversion value) in a number average molecular weight (Mn). It has a material of liquid and solid, and the state depends on the molecular weight. These are commercially available in a solution state dissolved in an organic solvent. A commercially available product can be used directly as a coating liquid containing polysilazane.

Another examples of polysilazane which is converted to ceramic include: silyl alkoxide added polysilazane, being produced by reacting silyl alkoxide with polysilazane having a main frame composed of a unit represented by the aforesaid Formula (1) (for example, refer to JP-A No. 5-238827); glycidol added polysilazane, being produced by reacting glycidol (for example, refer to JP-A No. 6-122852); alcohol added polysilazane, being produced by reacting alcohol (for example, refer to JP-A No. 6-240208); metal carboxylic acid added polysilazane, being produced by reacting metal carboxylate (for example, refer to JP-A No. 6-299118); acetyl acetonate complex added polysilazane, being produced by reacting acetyl acetonate complex attaining a metal (for example, refer to JP-A No. 6-306329); and metal fine particle added polysilazane, being produced by adding metal fine particles (for example, refer to JP-A No. 7-196986).

As an organic solvent to prepare a coating liquid containing polysilazane, it is not preferable to use an alcoholic solvent or water which easily reacts with polysilazane. Therefore, specific usable examples are: a hydrocarbon solvent such as an aliphatic hydrocarbon, an alicyclic hydrocarbon and an aromatic hydrocarbon; a halogenated hydrocarbon solvent; an ether such as an aliphatic ether, and an alicyclic ether. In particular, usable solvents include: a hydrocarbon such as pentane, hexane, cyclohexane, toluene, xylene, SOLVESSO™, and TARBEN; a halogenated hydrocarbon solvent such as methylene chloride and trichloroethane; and an ether such as dibutyl ether, dioxane, and tetrahydrofuran. These organic solvents may be chosen in accordance with characteristics, such as solubility of polysilazane, and an evaporation rate of an organic solvent, and a plurality of organic solvents may be mixed.

Although the polysilazane concentration in the coating solution containing polysilazane changes with the coating thickness of the targeted second barrier layer and the pot life of the coating solution, it is preferable to be about 0.2-35 mass %.

In order to promote the conversion to a silicon oxide, a catalyst such as an amine or a metal can also be added in a coating liquid containing polysilazane. As specific examples, cited may be AQUAMICA™, NAX120-20, NN110, NN310, NN320, NL110A, NL120A, NL150A, NP110, NP140 and SP140 produced by AZ ELECTRONIC MATERIALS, Ltd. (Organic Solvent in Second Barrier Layer and Water Removing Process)

It is preferable that a second barrier layer formed by a coating liquid containing polysilazane of the present invention is removed water before or during application of a reform treatment. Therefore, it is preferable that there are divided in two steps; a first step aiming at removal of an organic solvent contained in the second barrier layer; and a subsequent second step aiming at removal of water contained in the second barrier layer.

In the first step, in order to mainly remove an organic solvent, drying conditions can be suitably decided by means of such as heat treatment, and at this time, the condition may be in the state of removing water content. Although high temperature is preferable from the viewpoint of rapid treatment as for heat treatment temperature, it is preferable to determine temperature and a processing time suitably in consideration of the heat damage to the resin film base material. For example, when using a polyethylene terephthalate base material whose glass transposition temperature (Tg) is 70° C. as a resin base material, a heat treatment temperature can be set up 200° C. or less. As for a processing time, it is preferable to set up to be a short time so that a solvent may be removed and the heat damage to a base material may be decreases, and when the heat treatment temperature is 200° C. or less, it can be set up within 30 minutes.

The second step is a step to remove water contained in the second barrier layer. As a means to remove water, it is preferable to maintain it under a low humidity environment. Since the humidity under a low humidity environment changes depending on the temperature, a preferable embodiment for a relation between the temperature and the humidity will be decided by stipulation of the due point. A preferable due point is 4° C. or less (temperature 25° C./humidity 25%), a more preferable due point is −8° C. or less (temperature 25° C./humidity 10%), and a still more preferable due point is −31° C. or less (temperature 25° C./humidity 1%). It is preferable that the maintaining time is suitably decided depending on the thickness of the second barrier layer. When the thickness of the second barrier layer is 1.0 μm or less, it is preferable that the due point is −8° C. or less and the maintaining time is 5 minutes or less. Further, in order to facilitate the removal of water, it is possible to apply reduced pressure drying. The pressure in the reduced pressure drying is generally selected from a normal pressure to 0.1 MPa.

Preferable conditions of the second step in relation to the conditions of the first step are as follows. For example, when the solvent is removed at a temperature of 60 to 150° C. and the processing time of 1 minute to 30 minutes in the first step, it can select the conditions of the due point of 4° C. or less and the maintaining time of 5 minutes to 120 minutes in the second step. The classification of the first step and the second step can be made by the change of the due point. It can be determined when the difference of the due point in the process atmosphere becomes 10° C. or more.

The second barrier layer relating to the present invention is preferably subjected to a reform treatment with maintaining that condition after being removed the water content in the second step.

(Water Content in Second Barrier Layer)

The water content in the second barrier layer relating to the present invention can be measured according to the analytical method described below.

(Headspace Gas Chromatography/Mass Spectroscopy)

Apparatus: HP6890GC/HP5973MSD

Oven: 40° C. (2 min), then increased to 150° C. with a rising rate of 10° C./min Column: DB-624 (0.25 mmid×30 m)

Inlet: 230° C.

Detector: SIM m/z=18

HS condition: 190° C. and 30 min

The water content in the second barrier layer relating to the present invention is defined as a value of the water content obtained by the above-described analytical method divided by the volume of the second barrier layer. In the condition of after removing water in the second step, preferably, it is 0.1% or less. More preferably, the water content is 0.01% or less (detection limit or less).

In the present invention, it is a preferable embodiment to remove water before reforming treatment or during reforming treatment from the viewpoint of promoting a dehydration reaction of a second barrier layer which is converted to silanol.

[Reforming Treatment of Second Barrier Layer]

A reforming treatment described in the present invention is a conversion reaction of a silicon compound to silicon oxide or silicon oxynitride.

The reforming treatment of the present invention can be chosen from a known method based on a conversion reaction of a second barrier layer. In order to form a silicon oxide layer or a silicon oxynitride layer by the substitution reaction of a silicon compound, it is required a high temperature of 450° C. or more. This is hard to apply to a flexible substrate such as a plastic substrate.

Accordingly, when producing a gas barrier film of the present invention, it is preferable to adopt a conversion reaction using plasma or ultraviolet rays which can perform a conversion reaction with a lower temperature from the viewpoint of applying to a plastic substrate.

(Plasma Treatment)

In the present invention, although a plasma treatment used for a reforming treatment can be selected from a known method, preferably, the aforesaid atmospheric pressure plasma treatment can be cited.

(Heat Treatment)

The aforesaid reforming treatment can be performed by carrying out heat treatment to the coated layer containing a silicon compound.

As a heat treatment method, there are cited the following methods: a method to contact a substrate to a heating element, such as a heat block, and to heat a coated layer according to heat conduction; a method to heat an atmosphere with the external heater; and a method using a light of an infrared region like an IR heater. However, the present invention is not limited in particular. Moreover, it can suitably choose a method by which a surface smoothness of the coated layer containing a silicon compound is maintained.

As a temperature of the coated layer during the heat treatment, it can suitably adjust in the range of 50° C. to 250° C., more preferably, it is in the range of 100° C. to 250° C.

As a heating time, the range of 1 second to 10 hours is preferable, and more preferably, it is in the range of 10 seconds to 1 hour.

(Ultraviolet Ray Treatment)

In the present invention, it is preferable to perform treatment by irradiation with ultraviolet rays as one of the reforming treatments. Ozone and excited oxygen atom produced by ultraviolet rays (synonymous with ultraviolet lights) are provided with high oxidizing power, and they can form a silicon oxide film or silicon oxynitride layer having high tightness and high insulation at a low temperature.

By this irradiation with ultraviolet rays, the substrate is heated and $O_2$, $H_2O$, an ultraviolet absorbing agent, and polysilazane itself will be excited and activated to contribute to conversion to ceramic (silica conversion). As a result, polysilazane will be excited to result in converting polysilazane to ceramic. Further, the produced ceramic film will become tighter. The irradiation with ultraviolet rays is effective at any time of after the formation of a coated film.

With respect to the method relating to the present invention, any conventional ultraviolet ray generating devices can be used.

In addition, an ultraviolet ray as described in the present invention is an electromagnetic wave having a wavelength of 10-400 nm. In the case of ultraviolet ray irradiation except for vacuum ultraviolet ray (10-200 nm) treatment, preferably, it is used an ultraviolet ray having a wavelength of 210-350 nm.

Regarding the irradiation of vacuum ultraviolet light, it is preferable that the irradiation intensity and the irradiation time are set within the range where the substrate is not damaged.

When the case where a plastic film is used as a substrate is taken as an example, it is preferable to conduct the irradiation for 0.1 second-10 minutes by using a lamp of 2 kW (80 W/cm×25 cm), while the substrate-lamp distance is set so that the intensity of light on the substrate surface is 20-300 mW/cm$^2$, preferably 50-200 mW/cm$^2$.

Generally, when the substrate becomes 150° C. or more during the ultraviolet ray irradiation treatment, a plastic film substrate may be deformed or its strength may be decreased and the property of the substrate may be deteriorated. However, in the case of a high thermo resistive film such as polyimide, or a metal substrate, it is possible to perform a reforming treatment with higher temperature. Therefore, the temperature of the substrate during the ultraviolet ray irradiation has no upper limit temperature, and one of ordinary skill in the art can suitable set the temperature according to the kinds of substrate. Further, the atmosphere of ultraviolet ray irradiation is not limited in particular, and it can be carried out just in the air.

As a generating means for ultraviolet rays, it can be cited: a metal halide lamp, a high-pressure mercury lamp, a low-pressure mercury lamp, a xenon arc lamp, a carbon arc lamp, an excimer lamp (a single wavelength of 172 nm, 222 nm, and 308 nm, for example, made by USHIO, Inc.), and UV light laser. However, the means is not limited in particular. Moreover, when irradiating the generated ultraviolet rays to the second barrier layer, it is preferable to irradiate the generated ultraviolet rays to the second barrier layer after reflected with a light reflector from the viewpoint of achieving improved efficiency and a uniform exposure.

The vacuum ultraviolet light irradiation can be suitably applied for both a batch treatment and a continuous treatment, and can be suitably selected according to the shape of the substrate to be coated. For example, in the case of a batch treatment, a substrate (for example, a silicon wafer) which has a second barrier layer on the surface can be treated in a vacuum ultraviolet light calcination furnace equipped with a vacuum ultraviolet light source. A vacuum ultraviolet light calcination furnace itself is commonly known and, for example, one produced by EYEGRAPHICS Inc. may be used. When the substrate which has a second barrier layer on the surface is a long length film, conversion to a ceramics can be conducted by being continuously irradiated with vacuum ultraviolet light in a drying zone equipped with a vacuum ultraviolet light source as described above while the substrate is conveyed. The time required for ultraviolet light irradiation is generally 0.1 second to 10 minutes, and preferably, it is 0.5 seconds to 3 minutes.

(Vacuum Ultraviolet Ray Irradiation Treatment: Excimer Irradiation Treatment)

In the present invention, the most preferable reforming treatment method is a treatment by irradiation with vacuum ultraviolet rays (excimer irradiation treatment). The treatment by irradiation with vacuum ultraviolet rays uses a light energy of 100-200 nm which is larger than the atomic bonding force in the polysilazane compound. Preferably, by using a light energy of 100-180 nm, an atomic bonding is directly broken by the effect of photon called as a photo quantum process and an oxidation reaction by excited oxygen or ozone is proceeded. Thereby, formation of a silicon oxynitride film is achieved at a relatively low temperature.

As a required vacuum ultraviolet ray light source, a rare gas excimer lamp is used preferably.

Rare gas atoms, such as Xe, Kr, Ar, and Ne, are called an inert gas since they do not combine chemically to make a molecule. However, the rare gas atom acquired energy by electric discharge (excitation atom) can combine with other atoms to make a molecule. When the rare gas atom is xenon, the following reaction will occur.

$$e + Xe \rightarrow e + Xe^*$$

$$Xe^* + Xe + Xe \rightarrow Xe_2^* + Xe$$

During the time the excited excimer molecule $Xe_2^*$ transits to a ground state, an excimer light of 172 nm will be emitted.

As a distinctive feature of an excimer lamp, since radiation concentrates on one wavelength and other lights except a required light are emitted, it is cited that efficiency is high. Moreover, since an excessive light is not emitted, the temperature of a subject can be kept low. Further, since there is not required time for starting and re-starting, immediate lighting and extinguish are possible.

A method of using dielectric barrier discharge for obtaining excimer luminescence is known. The dielectric barrier discharge is a thin discharge similar to thunder and called as a micro discharge, which is generated in the gas space by applying a high frequency voltage of several tens kHz between both electrodes while providing a gas space via a dielectric (a transparent quartz in the case of an excimer lamp), and the micro discharge vanishes when the streamer of the micro discharge reaches at the tube wall (a dielectric) because charge is accumulated on the dielectric surface. This micro discharge is the discharge which spreads over the whole of the tube wall, by which the generation and the disappearance of discharge are repeated. For this reason, flickering of light occurs, which can be observed even with the naked eyes. Since a streamer having a very high temperature locally reaches the tube wall directly, there may be a possibility to accelerate the degradation of the tube wall.

As a method of obtaining excimer luminescence efficiently, discharge by non-electrode electric field is also possible in addition to dielectric barrier discharge.

The discharge by non-electrode electric field is done by capacity bonding, and it is also called as RE discharge. Although the used lamp and electrodes and their arrangement are basically the same as those for the dielectric barrier discharge, the high frequency wavelength impressed to the electrodes is several MHz. Since spatially and temporally uniform discharge can be obtained with discharge by non-electrode electric field, it can obtain a lamp without flicker and long lifetime.

In the case of the dielectric barrier discharge, micro discharge is taken place only between the electrodes. Therefore, in order to discharge in the whole discharge space, the outer electrode has to be covered the whole outer surface and, at the same time, it has to be transparent so as to take out light to the outside. For this purpose, it is used an electrode made of a fine metal wire mesh. Since this electrode is made of a metal wire as fine as possible in order to avoid shielding of light, this electrode is easy to be damaged with ozone generated by vacuum ultraviolet light under an oxygen environment.

In order to prevent this, it is necessary to make the circumference of a lamp, i.e., the inside of the irradiation equipment, into an inert gas atmosphere, such as nitrogen, and to prepare a window of synthetic quartz, and to take out illuminating radiation. The window of synthetic quartz is not only expensive expendables, but produce the loss of a light.

A double cylinder type lamp has an outside diameter of about 25 mm, therefore, it cannot disregard the difference of the distance between the directly underside of the lamp shaft and the lamp exposure lateral face. Accordingly, even if the lamp is arranged to be closely contacted, a uniform radiation distribution will not be obtained. If the irradiation equipment is made to be provided with a window of synthetic quartz, the distance in oxygen environment can be made uniform and uniform radiation distribution will be obtained.

When discharge by non-electrode electric field is used, it is not necessary to make an outer electrode into mesh texture. Glow discharge spreads to the whole electric discharge space only by preparing an outer electrode in a part of lamp external surface. As an outer electrode, an electrode made of an aluminum block which also serves as a light reflector of light is usually used for the lamp back. However, an outside diameter of a lamp is also as large as a lamp used for dielectric barrier discharge, synthetic quartz is needed in order to make it uniform radiation distribution.

The most distinctive feature of a small tube excimer lamp is that its structure is simple. Both ends of a silica tube are closed and a gas for performing excimer luminescence is only enclosed inside of the tube. Therefore, a very cheap light source can be offered.

Since the double cylinder type lamp is subjected to processing which connects and closes the both ends of an inside and an outside pipe, it is easy to be damaged when handling or transportation it, compared with a small tube lamp. An outer diameter of a pipe of a small tube lamp is about 6 to 12 mm, and when it is too large, high voltage is needed for starting.

Any one of dielectric barrier discharge and non-electrode electric field discharge can be used for the mode of electric discharge. As for the shape of electrode, although the face which touches a lamp may be a plane, if the shape of electrode is made to be corresponded to the curve of the lamp, it can fix the lamp firmly, and electric discharge is stabilized more by the electrode being closely contacted with the lamp. Moreover, if a curved surface is made into a mirror surface with aluminium, it will also become a light reflector.

Xe excimer lamp emits a ultraviolet ray of a single short wavelength of 172 nm, and it is excellent in luminous efficiency. This light has a large absorption coefficient of oxygen, high concentration of a radical oxygen atom species and ozone can be generated with very a small quantity of oxygen. Moreover, it is known that the light energy of a short wavelength of 172 nm has a high potential to dissociate a bond in an organic substance. Property modification of polysilazane film is realizable in a short time with the high energy which is possessed by this active oxygen, ozone, and ultraviolet radiation. Therefore, compared with a low-pressure mercury lamp emitting a wavelength of 185 nm or 254 nm and plasma washing, it is possible to shorten the process time due to high throughput or decrease of equipment area, and it becomes possible to irradiate to an organic material or to a plastic substrate which is easy to receive the damage with heat.

An excimer lamp has a high generating efficiency of light, as a result, it is possible to make the light switch on by an injection of low electric power. Moreover, it is not emitted a light with a long wavelength leading to a temperature increaser, but since it emits energy of a single wavelength in a ultraviolet light region, it has a distinctive feature of suppressing an increase of a surface temperature of an exposure subject. For this reason, it is suitable for flexible film materials, such as a polyethylene terephthalate which is supposed to be easy to be affected by heat.

[Confirmation of Reformed Region Inside of Second Barrier Layer]

As shown in FIG. 1, in a preferable embodiment of the present invention, a second barrier layer has a low reformed region at a substrate side and a high reformed region at a surface side. The reformed region formed by a reforming treatment can be confirmed with a various kinds of methods. The most effective method is confirmation by observation with a transmission electron microscope (TEM) for a cross-section of a second barrier layer after being subjected to a reforming treatment.

(Cross-Section TEM Observation)

Cross-section TEM observation is done after preparing a thin leaf of a gas barrier layer with a FIB processing apparatus described below. When an electron beam is continuously irradiated to the sample, there appears a contras difference between a portion receiving damage and a portion without receiving damage. The reformed region relating to the present invention is mage tight by a reforming treatment and it hardly receives damage, while in the non-reformed region, it received damage by an electron beam and quality modification will be recognized. By the confirmation of the cross-section TEM observation, it is possible to calculate the layer thickness of the reformed region and the non-reformed region.

(FIB Processing)
    Apparatus: SMI 2050 made by SII
    Processing ion: (Ga 30 kV)
    Sample thickness: 100 nm-200 nm (TEM Observation)
    Apparatus: JEM 2000FX made by JOEL (accelerating voltage: 200 kV)
    Electron beam irradiation time: 5 seconds-60 seconds (Film Composition Analysis in Depth Direction)

While trimming a gas barrier film in the depth direction, measurement of composition ratio is successively carried out, and a bending point of composition ratio is determined. It may be decided as an interface between a reformed region and a non-reformed region. In order to perform a layer composition analysis of the present invention, it is possible to use XPS (X-ray photoelectron spectroscopic) surface analyzing apparatus and to determine the value. In the present invention, ESCA LAB-200R (made by VG Scientific Ltd.) was used as an XPS surface analyzing apparatus. Specifically, Mg was used as an X-ray anode, and the measurement was done with output of 600 W (accelerating voltage: 15 kV; emission electric current: 40 mA). Energy resolution was set to be 1.5 eV to 1.7 eV when determined at a half wave width of Ag3d5/2. After composition analysis of the second barrier layer surface was carried out, the measurement was done successively while removing 1% of the layer thickness of the second barrier layer by etching. In order to remove the second barrier layer, it is preferable to use an ion gun which can use a rare gas ion. As an ion species, it can use: He, Ne, Ar, Xe and Kr. In the present measurement, Ar ion etching was used and the second barrier layer was successively removed. First, the measurement was done with respect to the bonding energy in the range of 0 eV to 1,100 eV with a data taking interval of 1.0 eV, and the kinds of the detected elements were determined. Then, with respect to all of the detected elements except the etching ion, the photoelectron peaks which gave a maximum intensity were subjected to a narrow scanning with a data taking interval of 0.2 eV, and the spectrum of the elements each was measured. In order to reduce the difference of the content ratio calculation results depending on the measuring apparatus or computer, the data of the obtained spectra were transferred to COMMON DATA PROCESSING SYSTEM (made by VAMAS-SCA-JAPAN, Ltd.), and the data were processed with this software. Thus, the content ratio values of the analysis targeted elements (Carbon, oxygen, silicon and titanium) were determined as an atomic concentration (at %). Before performing quantity analysis, count scale calibration was done for each element, and smoothing of 5 points was performed. In the quantity analysis, a peak area strength (cpsXeV) eliminated with a back ground was used. As a back ground eliminating process, a method of Shirley was used. Regarding the method of Shirley, D. A. Shirley, Phys. Rev., B5, 4709 (1972) can be referred to.

In the present invention, when a silicon compound is polysilazane, it can be detected $SiO_x$ in a reformed region, and $SiO_xN_y$ in a non-reformed region as a main component.

As an evaluated thickness of the reformed region 4A, it is preferable to be from 0.2 or more to 0.9 or less as a thickness ratio with respect to the thickness of the second barrier layer 4. More preferably, it is from 0.4 or more to 0.8 or less. When the thickness of the reformed region 4A with respect to the thickness of the second barrier layer 4 is less than 0.2, the barrier property of the second barrier layer is insufficient and it is not preferable. On the contrary, when it is larger than 0.9, the second barrier layer will become a uniformly reformed layer, and it is not preferable because it lacks flexibility.

The total thickness of the second barrier layer is preferably 60 nm-600 nm, and more preferably, it is 60 nm-300 nm.

As in the case of the present invention, the gas barrier layer which is obtained by performing a reforming treatment to the second barrier layer can be avoided crack induced by concentration of stress to result in compatibility of both high barrier property and stress releasing function by making the ratio of the reformed region within the above-described range. In particular, by adopting a vacuum ultraviolet as a means of reforming treatment, a surface treatment can be performed effectively in a short time. This means is preferable, since the effect of the present invention is remarkably obtained.

(Measuring Method of Elastic Modulus: Nanoindentation)

In a preferable embodiment of the gas barrier film of the present invention, it is preferable that a first barrier layer 3 formed with a chemical vapor deposition method contains silicon oxide or silicon oxynitride, and that elastic moduli satisfy the relationship of: $E1>E2>E3$, when E1 is an elastic modulus of the first barrier layer 3, E2 is an elastic modulus of the reformed region 4A in the second barrier layer 4, and E3 is an elastic modulus of the non-reformed region 4B in the second barrier layer 4.

The elastic moduli of the first barrier layer, and the reformed region and the non-reformed region in the second barrier layer can be determined with a conventionally known measuring method of elastic modulus. For example, the following methods are cite: to measure a fixed strain under the condition of multiplying with a predetermined frequency (Hz) by using VIBRON DDV-2 (made by Orientech Co., Ltd.): to measure as a value obtained by changing an impressed strain with a predetermined frequency after forming a second barrier layer on a transparent substrate by using an measuring apparatus of RSA-II (made by Rheometrics, Inc.); and to measure using a nanoindenter applying a nanoindentation method such as Nano Indenter TMXP/DCM (made by MTS System, Ltd.).

From the viewpoint of measuring the elastic modulus of each of the very thin layers relating to the present invention with high precision, it is preferable to determine by measuring with a nanoindenter.

The "nanoindentation method" described here is a way to measure as follows. After pushing an indenter of the triangular pyramid having a tip radius of about 0.1 to 1 μm with an ultra minute load to impress a load to the second barrier layer prepared on the transparent base material which is a target measuring object, then, the indenter is removed to unload. Then, after creating a load-displacement curve, an elastic modulus (a reduced modulus) is obtained from the impressed load obtained from the load-displacement curve and the pushing depth to the second barrier. In this nanoindentation, it can measure a displacement resolution with high accuracy of 0.01 nm employing a very small load such as a maximum load of 20 mN with a head assembly of a load resolution of 1 nN.

In particular, with respect to a second barrier layer of the present invention which has different elastic moduli depending on the cross-sectional direction, it is preferable to push an indenter having an ultra minute triangular pyramid from the cross section to measure the elastic modulus at the portion of the substrate side in the cross section. In such case, it was developed a nanoindenter which can operate within a scanning electron microscope from the viewpoint of increasing accuracy more, and it can apply this nanoindenter to measure.

As for the relation of the elastic modulus of each layer, it is preferable to satisfy the relation of E1>E2>E3, from the measured values of elastic modulus as described above. By satisfying this relation, the stress concentration at the time of bending can be controlled in the reformed portion (E2) in the reformed treatment side and the first barrier layer (E1), and bending resistance is extremely improved. A preferable elastic modulus value E1 depends on the material composing the first barrier layer. For example, in the case of silicon oxide or silicon oxynitride, preferably, it is 10 to 100 GPa, more preferably, it is 20 to 50 GPa. It can adjust arbitrarily E2 of E3 in the second barrier layer by changing the reforming condition within the extent which satisfies the above-mentioned expression.

[Film Density of First Barrier Layer and Second Barrier Layer (in Reformed Region and Non-Reformed Region)]

In the bas barrier film of the present invention, it is preferable that a first barrier layer 3 formed with a chemical vapor deposition method contains at least one selected from the group consisting of silicon oxide, silicon oxynitride, and silicon nitride; and that film densities satisfy the relationship of: D1>D2>D3, when D1 is a film density of the first barrier layer 3, D2 is a film density of the reformed region 4A in the second barrier layer 4, and D3 is a film density of the non-reformed region 4B in the second barrier layer 4.

The following reason shows that the film density composition specified above is preferable.

Originally, water and oxygen will have difficulty to pass through the film in proportion with the tightness of the film. Therefore, only the first barrier film 3 will be enough to obtain a sufficient barrier property. However, water and oxygen will pass through even this high-density barrier layer in many cases due to the secondary defect generated by the primary defect such as so called a micro crack which is difficult to observe or by the process to produce as an outermost layer. Thus, there is a fear that the barrier is not sufficient. Further, poor bending resistance and poor adhesion will become a cause to deteriorate a barrier property. By arranging a second barrier layer 4 on a first barrier layer, and by making satisfying the relation of film densities of D1>D2>D3, as described above, water and oxygen passed through the above-described defect will have much difficulty to penetrate due to the maze effect. And, deterioration of bending resistance and deterioration of close adhesion will be reduced. Further, by the effect that the second barrier layer 4 plays the roll of a protective film to the first barrier layer 3, it can realize a gas barrier film having a high barrier property, and excellent in bending resistance and having a cutting process aptitude.

In addition, it is preferable that: a film density difference (D1−D2) is 0.05 to 1.30; a film density difference (D1−D3) is 0.15 to 1.40; a film density difference (D2−D3) is 0.10 or more; and more preferably a film density difference (D2−D3) is 0.10 to 0.40 (D1, D2 and D3 each being the above-described film density).

By making the film differences specified above, a suitable maze effect appears, and deterioration of bending resistance or adhesion is prevented, and further, the overcoat effect in a processing manufacturing process is also fully acquired, and it can raise the fade resistance of a device in a total.

In the present invention, a film density D1 of a first barrier film 3, a film density D2 of a reformed region in a second barrier film 4, and a film density D3 of a non-reformed region in a second barrier film 4 can be obtained according to the following method.

(Measurement of X-ray Reflection Ratio of a Film Density Distribution)

X-ray reflection ratio measuring apparatus: Thin film structure evaluation apparatus ATG-G (made by Rigaku Corporation)

X-ray source target: Copper (1.2 kW)

Measurement: X-ray reflection ratio curve is measured using a 4 crystal monochromatic meter to produce a model of a density distribution profile, then fitting is carried out to obtain a density distribution in a depth direction.

in a second barrier film 4 concerning the present invention, although it is a preferable embodiment in which exists a reformed region 4A, the reformed region concerning the present invention has the following characteristics.

(1) In the second barrier film 4 concerning the present invention, there is observed no clear interface which distinguishes the regions having a different property by the super-high resolving TEM (Transmission Section Microscope) of the cross-section.

On the other hand, if it is intended to laminate a portion which has a different property with a vapor deposition method, it will be certainly produced an interface from the nature of the method. And owing to the minute ununiformity which occurs at an interface, there will appear dislocation lines, such as spiral transposition and edge-like transposition, at the time of deposition of the gaseous phase molecule in the lamination direction, and they are observed by the super-high resolving TEM.

Since the second barrier film 4 concerning the present invention is subjected to a reforming treatment for a coated film containing a silicon compound, it is presumed that regions having a different property without an interface can be formed, without producing dislocation lines which are easily produced at the time of deposition of the gaseous phase molecule.

(2) In the second barrier film 4 concerning the present invention, there is produce a high-density region in the reformed region 4A. When an atomic distance of Si—O in the high-density region is measured with FT-IR in the depth direction, it is confirmed a micro crystal region and it is confirmed existence of a crystal region in the high-density region.

Usually, $SiO_2$ is observed to be crystallized by a heating treatment at 1,000° C. or more. On the other hand, $SiO_2$ in a surface region of a second barrier layer of the present invention can be achieved crystallization by a heating treatment at a low temperature of 200° C. or less on a resin substrate. A clear reason for this is not found. The present inventors assumed as follows. A 3 to 5 ring structure contained in polysilazane has a favorable atomic distance for forming a crystal structure. And, it is not required a dissolution, rearrangement and crystallization process usually occurred at a temperature of 1,000° C. or more. A reforming treatment contributes to the short distance order already established. And it can achieve structure ordering with less energy. Especially, in an irradiation treatment with vacuum ultraviolet rays, it is preferable to perform breaking of chemical bond such as Si—OH with an irradiation treatment with vacuum ultraviolet rays in combination with an oxidation treatment by ozone generated in the irradiation space. This combination is preferable to make effective treatment.

Particularly, in the reforming treatment of the second barrier layer of a preferable embodiment of the present invention, it is most preferable to perform a reforming treatment by irradiation with vacuum ultraviolet rays to form a reformed region. Although the mechanism of forming this reformed region has not been evident, the present inventors presume that direct breaking of a silazane compound by photo energy and surface oxidation reaction by an activated oxygen or ozone generated in the gas phase proceed simultaneously to result in reforming speed difference of reforming treatment at a surface side and an inner side. As a result, a reformed region is formed. Further, as a means to control actively the reforming speed difference of reforming treatment, it is cited a method of controlling the surface oxidation reaction by an activated oxygen or ozone generated in the gas phase. Namely, by changing the condition of the elements which contribute the surface oxidation reaction, such as oxygen density, surface temperature, irradiation distance and irradiation time, during the irradiation, it can obtain a required composition and thickness of the reformed region. Especially, it is preferable to changing the condition of oxygen density during the irradiation. A nitrogen density of a surface side can be reduced by increasing the oxygen density by changing the condition and the layer thickness can be increased.

As reforming conditions, it can be selected from the following range, for example, in the case of a second barrier layer having a thickness of 50 to 100 nm: luminous intensity of vacuum ultraviolet of 10 to 200 mJ/cm$^2$, irradiation distance of 0.1-10 mm, oxygen density of 0 to 5%, due point of 10 to −50° C., temperature of 25 to 200° C., and treatment time of 0.1 to 150 sec.

(Surface Roughness: Smoothness)

The surface roughness (Ra) at a side of a second barrier layer of the present invention which is subjected to a reformation treatment is preferably 2 nm or less. More preferably, it is 1 nm or less. By making the surface roughness in the range stipulated above, it can improve light transmitting efficiency resulting from a smooth layer surface having little irregularity when it is used as a resin substrate of an organic photoelectron conversion element, and it can improve energy conversion efficiency resulting from decrease of leak current between the electrodes. The surface roughness (Ra) of the gas barrier layer of the present invention can be measured with the following method.

<Measuring Method of Surface Roughness: AFM Measurement>

A surface roughness can be determined with AFM (atomic force microscope), for example, DI3100 made by Digital Instrument, Co. It is calculated from a cross section curve of irregularity obtained by continuous measurement with a detector having a sensing pin which has a very small tip diameter. Inside of a section of tens μm of measurement direction is measured many times with a sensing pin which has a very small tip diameter. The obtained value is a roughness concerning minute amplitude of irregularity.

(Cutting Process Aptitude)

The gas barrier film of the present invention excels in cutting process aptitude. That is, there is no fray at a cutting surface after cutting process. It can increase an effective area.

When the conventional gas barrier film was subjected to a cutting processing, it produced a phenomenon in which the end of the cut sheet vigorously broke including the film like glass by the stress applied to the film. The effective area as a manufactured product was decreased from the crack of the cutting side, and there was a problem that manufacturing efficiency was inferior. The present inventors investigated the reason of vigorous breaking of the conventional gas barrier film like glass during the cutting process. However, the mechanism of this breaking was not able to be clarified. In the preferable embodiment of the present invention, it was found that it was dispersed the stress applied to the edge portion at the time of cutting by using a second barrier film containing a reformed region and a non-reformed region resulting from a reforming treatment. Thus, the present invention was achieved.

(Method of Cutting)

Although a method of cutting is not limited in particular, it is preferable to carry out by ablation processing by high energy laser, such as ultraviolet laser (for example, wavelength of 266 nm), infrared laser, and carbon dioxide laser. Since the gas barrier film has an inorganic thin film which breaks easily, when it is cut by an usual cutter, a crack may be generated it in the cutting portion. Further, the crack at the time of cutting can be prevented by provided with a protective layer attaining an organic ingredient on a surface of a first barrier layer.

[Composition of Gas Barrier Film]

(Substrate)

As a substrate for a gas barrier film (hereafter, if is called as a substrate), it is not specifically limited when it is formed with an organic material which can hold gas barrier layers (a first barrier layer and a second barrier layer) which exhibit a barrier property.

Examples of an organic material include: resin films of acrylic acid ester, methacrylic acid ester, polyethylene terephthalate (PET), polybutylene terephthalate, polyethylenenaphthalate (PEN), polycarbonate (PC), polyallylate, polyvinyl chloride (PVC), polyethylene (PE), polypropylene (PP), polystyrene (PS), nylon (Ny), aromatic polyamide, polyether ether ketone, polysulfone, polyethersulfone, polyimide, and polyetherimido; a heat-resistant transparent film containing silsesquioxane having an organic-inorganic hybrid structure as a basic skeleton (product name Sila-DEC™, produced by Chisso Corp.); and plastic films having two or more laminated layers of above mentioned plastics. With respect to the cost or the ease of acquisition, for example, polyethylene terephthalate (PET), polybutylene terephthalate and polyethylenenaphthalate (PEN), polycarbonate (PC) are preferably used. Alternatively, with respect to optical transparency, heat resistance and adhesion with a first barrier layer (a gas barrier layer), a heat resistant transparent film having a basic frame of silsesquioxane may be preferably used. The thickness of a substrate is preferably 5-500 μm and more preferably 25-250 μm.

Further, the substrate according to the present invention is preferably transparent. It is because, when the substrate is transparent and the layer formed on the substrate is also transparent, a transparent gas barrier film can be obtained, whereby it is possible to use the barrier film as a transparent substrate of, for example, an organic EL element.

The substrate made of one of the above-mentioned resins may be a stretched film or a non-stretched film.

A substrate used in the present invention can be produced by a common method well-known in the art. For example, by melting a resin used as a material in an extruding apparatus, and by extruding the melt through a tubular die or a T-die to quench the melt, a substantially amorphous, non-oriented and non-stretched substrate can be obtained. Also, a stretched substrate may be produced by stretching a non-stretched substrate in a film conveyance direction (a longitudinal direction) or a direction perpendicular to the film conveyance direction (a transverse direction) via uniaxial stretching, sequential biaxial stretching via a tenter method, simultaneous biaxial stretching via a tenter method or simultaneous biaxial stretching via a tubular method. The stretching ratio in this case is preferably 2-10 times in each of the longitudinal axis direction and the transverse axis direction, although the stretching ratio may be appropriately selected in accordance with the resin as a raw material of the substrate.

Further, for a substrate according to the present invention, before providing a first barrier layer, a corona treatment may be conducted on the substrate.

Furthermore, an anchor coat agent layer may be provided on the surface of the substrate concerning the present invention for the purpose of improvement in adhesion with a first barrier layer. Examples of an anchor coat agent used for the anchor coat agent layer include a polyester resin, an isocyanate resin, a urethane resin, an acrylic resin, an ethylene vinyl alcohol resin, a modified vinyl resin, an epoxy resin, a modified styrene resin, a modified silicone resin, and alkyl titanate, which may be used alone or in combination of two or more kinds thereof. A conventionally well-known additive agent can also be added to these anchor coat agents. The anchor coating may be conducted by applying an anchor coating agent such as described above on a plastic film via a method known in the art, for example, a roll coat method, a photogravure coat method, a knife coat method, a dip coat method, and a spray coat, followed by drying to remove such as a solvent or a dilution agent. The applying amount of the anchor coating agent as aforementioned is preferably around 0.1-5 g/m² (under a dried condition).

(Smooth Layer)

Further, it is preferable that a smooth layer is provided on a surface of a substrate of the present invention, provided that the smooth layer has a pencil hardness of H or more specified by JIS K 5400; a maximum section height Rt(p) of: 10 nm<Rt(p)<30 nm, as a surface roughness specified by JIS B 0601.

If the surface pencil hardness and Rt(p) are within the above-described ranges, a layer thickness of a smooth layer is not limited in particular. In order to cover unevenness of the resin substrate surface, and to form a smooth surface and to secure flexibility, a layer thickness of a smooth layer is preferably 0.1 μm-10 μm, and more preferably it is 0.5 μm-6 μm.

As in the present invention, when a second barrier layer is formed by reforming a coated film of a silicon compound prepared on a first barrier layer formed with a chemical vapor deposition method, while the second barrier layer has a merit of repairing the defect of the first barrier layer to make smooth the surface of the first barrier layer, it may produce a defect due to the stress received by the first barrier layer accompanied by contraction in the reforming process to the high density inorganic compound film which has high gas barrier property resulting from a coated film. Thus, it may exist a demerit of sufficiently utilize the composition of the present invention.

As a result of an extensive investigation by the present inventors, it was found as follows. By providing with a smooth layer having a pencil hardness of H or more and a maximum height difference Rt of: 10 nm<Rt<30 nm on the lower layer of the first barrier layer, it can avoid concentration of the contraction stress at the time of forming a second barrier layer to the first barrier layer, and the effect of the composition of the present invention was most effectively exhibited.

Further, the embodiment in which the content of the inorganic ingredient in the smooth layer is higher is preferable from the viewpoints of: close adhesion of the first barrier layer and the substrate; and increase of hardness of the smooth layer. It is preferable that the content of the inorganic ingredient is 10 mass % or more based on the total weight of the smooth layer, more preferably, it is 20 mass % or more. The smooth layer may be a hybrid composition by mixing an organic resin binder (photopolymer) with inorganic particles, and it may be an inorganic layer which can be formed by a sol-gel process. Moreover, it is possible to use as a smooth layer a layer formed by curing an inorganic polymer (or oligomer) such as polysilazane with heat or ultraviolet rays. Further, it is also possible to make a laminated structure of these layers according to the purpose.

A smooth layer is prepared in order to carry out leveling of the unevenness of the transparent resin film substrate which has a projection, or to burry the unevenness and the pinhole which were produced in the first transparent barrier layer by the projection existing in the transparent resin film substrate. Fundamentally, such a smooth layer is formed by curing a photopolymer.

As photopolymers used for formation of a smooth layer, examples are: a resin composition containing an acrylate compound having a radical reactive unsaturated compound; a resin composition containing an acrylate compound and mercapto compound having a thiol group; a resin composition dissolved a polyfunctional acrylate monomer such as epoxy acrylate, urethane acrylate, polyester acrylate, polyether acrylate, polyethylene glycol acrylate, and glycerol methacrylate.

Examples of a reactive monomer which contains at least one photopolymerizable unsaturated bond in the molecule include: methyl acrylate, ethyl acrylate, n-propyl acrylate, isopropyl acrylate, n-butyl acrylate, isobutyl acrylate, tert-butyl acrylate, n-pentyl acrylate, n-hexyl acrylate, 2-ethylhexyl acrylate, n-octyl acrylate, n-decyl acrylate, hydroxyethyl acrylate, hydroxypropyl acrylate, allyl acrylate, benzyl acrylate, butoxyethyl acrylate, butoxyethyleneglycol acrylate, cyclohexyl acrylate, dicyclopentanyl acrylate, 2-ethylhexyl acrylate, glycerol acrylate, glycidyl acrylate, 2-hydroxyethyl acrylate, 2-hydroxypropyl acrylate, isobornyl acrylate, isodexyl acrylate, iso-octyl acrylate, lauryl acrylate, 2-methoxyethyl acrylate, methoxyethylene glycol acrylate, phenoxyethyl acrylate, stearyl acrylate, ethylene glycol diacrylate, diethylene glycol diacrylate, 1,4-butanediol diacrylate, 1,5-pentanediol diacrylate, 1,6-hexadiol diacrylate, 1,3-propanediol acrylate, 1,4-cyclohexanediol diacrylate, 2,2-dimethylolpropane diacrylate, glycerol diacrylate, tripropylene glycol diacrylate, glycerol triacrylate, trimethylolpropane triacrylate, polyoxyethyltrimethylolpropane diacrylate, pentaerythritol triacrylate, pentaerythritol tetraacrylate ethylene oxide modified pentaerythritol triacrylate, ethylene oxide modified pentaerythritol tetraacrylate, propylene oxide modified pentaerythritol triacrylate, propylene oxide modified pentaerythritol tetraacrylate, triethylene glycol diacrylate, polyoxypropyltrimethylolpropane triacrylate, butyleneglycol diacrylate, 1,2,4-butanediol triacrylate, 2,2,4-trimethyl-1,3-pentadiol diacrylate, diallyl fumarate, 1,10-deccandiol dimethyl acrylate, pentaerythritol hexaacrylate, and the compounds in which the above-mentioned acrylate are changed to methacrylate, γ-methacryloxypropyl trimethoxysilane, and 1-vinyl-2-pyrrolidone. The above-described reactive monomers can be used as a single compound or as a mixture of two or more compounds, or it may be used with other compound.

The photosensitive resin composition contains a photo polymerization initiator.

Examples of a photo polymerization initiator include: benzophenone, o-benzoyl methyl benzoate, 4,4-bis(dimethylamine)benzophenone, 4,4-bis(diethylamine)benzophenone, α-amino acetophenone, 4,4-dichlorobenzophenone, 4-benzoyl-4-methyldiphenyl ketone, dibenzyl ketone, fluorenone, 2,2-diethoxyacetophenone, 2,2-dimethoxy-2-phenylacetophenone, 2-hydroxy-2-methylpropiophenone, p-tert-butyldichloroacetophenone, thioxanthone, 2-methylthioxanthone, 2-chlorothioxanthone, 2-isopropylthioxanthone, diethylthioxanthone, benzyldimethylketal, benzylmethoxyethylacetal, benzoin methyl ether, benzoin butyl ether, anthraquinone, 2-tert-butylanthraquinone, 2-almylanthraquinone, β-chloroanthraquinone, anthrone, benzanthrone, dibenzosuberone, methyleneanthrone, 4-azidobenzylacetophenone, 2,6-bis(p-azidobenzylidene)cyclohexane, 2,6-bis(p-azidobenzylidene)-4-methylcyclohexanone, 2-phenyl-1,2-butanedione-2-(o-methoxycarbonyl)oxime, 1-phenyl-1,2-propanedione-2-(o-methoxycarbonyl)oxime, 1,3-diphenyl-propanetrione-2-(o-methoxycarbonyl)oxime, 1-phenyl-3-ethoxy-propanetrione-2-(o-methoxycarbonyl) oxime, Michler's ketone, 2-methyl[[4-(methylthio)phenyl]-2-monopholino-1propane, 2-benzyl-2-dimethylamino-1-(4-monopholinephenyl-butanone-1, naphthalenesulfonylchloride, quinolinesulfonyl chloride, n-phenylthioacrydone, 4,4-azobis isobutyronitrile, diphenyl disulfide, benzthiazole disulfide, triphenylphosphine, camphorquinone, carbon tetrachloride, tribromophenylsulfone, benzoin peroxide, eosin, and a combination of a photo reductive dye such as methylene blue with a reducing agent such as ascorbic acid and triethanol amine. These polymerization initiator may used alone or in combination of two or more kinds.

The method of forming a smooth layer is not specifically limited, however, preferably employed are wet methods, for example, a spin coating method, a spray coating method, a blade coating method, and a dip coating method.

In a forming process of a smooth layer, an additive such as an antioxidant, an ultraviolet absorber or a plasticizer may be added in the aforementioned photosensitive resin, if needed. An appropriate resin or an additive may be added in any organic layer irrespective of the laminate position in order to improve the film forming property or to avoid occurrence of pin holes.

Examples of a solvent used when forming a smooth layer using an application liquid in which a photosensitive resin is dissolved or dispersed in a solvent include: alcohols such as methanol ethanol, n-propanol, iso-propanol, ethylene glycol and propylene glycol; terpenes such as α- and β-terpineol; ketones such as acetone, methyl ethyl ketone, cyclohexanone, N-methyl-2-pyrrolidone, diethyl ketone, 2-heptanone and 4-heptanone; aromatic hydrocarbons such as toluene, xylene, and tetramethyl benzene; glycol ethers such as cellosolve, methyl cellosolve, ethyl cellosolve, carbitol, methyl carbitol, ethyl carbitol, butyl carbitol, propyleneglycol monomethyl ether, propyleneglycol monomethyl ether, propyleneglycol monoethyl ether, dipropyleneglycol monomethyl ether, dipropyleneglycol monoethyl ether, triethyleneglycol monomethyl ether and triethyleneglycol monomethyl ether, esters such as ethyl acetate, butyl acetate, cellosolve acetate, ethylcellosolve acetate, butylcellosolve acetate, carbitol acetate, ethylcarbitol acetate, butylcarbitol acetate, propyleneglycol monomethylether acetate, propyleneglycol monoethylether acetate, 2-methoxyethyl acetate, cyclohexyl acetate, 2-ethoxyetyl acetate and 3-methoxybutyl acetate; diethyleneglycol dialkylether, dipropyleneglycol dialkylether, 3-ethoxyethyl propionate; methyl benzoate; N,N-dimethylacetamide; and N,N-dimethylformamide.

The flatness of a smooth layer is a value expressed by the surface roughness specified by JIS B 0601, and the maximum profile peak height Rt(p) is preferably from 10 nm or more to 30 nm or less. When Rt(p) is smaller than 10 nm, it will require excessive time for the production of a smooth layer and there may produce degradation of adhesiveness with a first barrier layer. And, when Rt(p) is larger than 30 nm, it will produce a defect during the formation of a first barrier layer. As a result of increasing the irregularity of a surface of a first barrier layer, it may become difficult to smooth the irregularity after applying a silicon compound when forming a second barrier layer. It will be deteriorated gas barrier property.

The surface roughness is calculated from a cross-sectional curve of the irregularity obtained by a continuous measurement using a detector having a stylus of the minimal tip radius in an atomic force microscope (AFM), which is a roughness relating the amplitude of minute irregularity obtained by multiple measurements within a range of several tens μm using a stylus of the minimal tip radius.

<Additive in Smooth Layer>

One of the preferable embodiments is an embodiment in which a reactive silica particle is contained in a photo reactive resin, provided that the reactive silica particle incorporates a photo reactive group having a photo polymerization property on the surface of the silica particle (hereafter, it is simply called as "reactive silica particle"). Here, as a photo reactive group, it can be cited a polymerizable unsaturated group represented by (meth)acryloyloxy group. The photo reactive resin may be a photopolymerizable compound with a photo reactive group having a photo polymerization property incorporated on the surface of the reactive silica particle. Example thereof is an unsaturated organic compound having a polymerizable unsaturated group. As a photo reactive resin, it may be used a composition of these reactive silica particle and unsaturated organic compound having a polymerizable unsaturated group prepared by suitably adjusting the solid component with mixing a diluting solvent for general use.

Here, as an average particle diameter of a reactive silica, it is preferable to be 0.001-0.1 μm. By setting the average particle diameter in this range, and by using with a matting agent made of inorganic particles having an average particle diameter of 1-10 μm described later, it is easily formed a smooth layer provided with: well-balanced optical properties of both anti-glare property and resolution, which are the effect of the present invention; and a hard coat property. From the viewpoint of obtaining these effects easily, it is more preferable to use a silica particle having an average particle diameter of 0.001-0.01 μm.

In the smooth layer used in the present invention, it is preferable to contain the above-described inorganic particles in an amount of 10% or more as a weight ratio. It is more preferable to contain in air amount of 20% or more. By the addition of 10% or more, a close contact property with a gas barrier layer will be increased.

In the present invention, the following compound can be used as a reactive silica particle. This compound contains a chemical bond between silica particles through a silyloxy group produced by a hydrolysis reaction of a hydrolytic silyl group in hydrolytic silane modified with a polymerizable unsaturated group.

Examples of hydrolytic silane include: an alkoxysilyl group, a carboxysililate silyl group such as an acetoxysilyl group, a halogenated silyl group such as a chlorosilyl group, an aminosilyl group, an oxymsilyl group, and a hydrylsilyl group.

Examples of a polymerizable unsaturated group include: an acryloyloxy group, a methacryloyloxyl group, a vinyl group, a propenyl group, a butadienyl group, a styryl group, an ethynyl group, a cinnamoyl group, a malate group, and an acrylamide group.

In the present invention, the thickness of the smooth layer is 0.1-10 μm, and preferably, it is 1-6 μm. By making it to be 1 μm or more, the smoothness of the film having a smooth layer will be sufficient and the surface hardness will be improved. By making it to be 10 μm or less, it is easy to adjust the balance of optical properties of the smooth film, and at the same time, it become easy to suppress curl of the smooth film when the smooth layer is provided on only one side of the transparent polymer film.

(Bleedout Prevailing Layer)

A bleedout preventing layer is preferably provided on the surface of a substrate opposite to the surface on which the organic layer is provided, in order to avoid the contamination of the contact layer due to the migration of such as an unreacted oligomer from the inside of the substrate to the surface, when a film having an organic layer is heated. As far as the bleedout preventing layer has this function, the bleedout preventing layer may have the same constitution as that of the organic layer.

As an unsaturated organic compound having a polymerizable unsaturated group, which may be incorporated in a bleedout prevention layer, a polyvalent unsaturated organic compound having two or more polymerizable unsaturated groups in the molecule or a monovalent unsaturated organic compound having one polymerizable unsaturated group in the molecule may be cited.

Here, examples of a multivalent unsaturated organic compound include: ethylene glycol di(meth)acrylate, diethylene glycol di(meth)acrylate, glycerol di(meth)acrylate, glycerol tri(meth)acrylate, 1,4-butanediol di(meth)acrylate, 1,6-hexanediol di(meth)acrylate, neo-pentyl glycol di(meth)acrylate, trimethylolpropane tri(meth)acrylate, dicyclopentanyl di(meth)acrylate, pentaerythritol tri(meth)acrylate, pentaerythritol tetra(meth)acrylate, dipentacrythritol hexa(meth)acrylate, dipentaerythritol monohydroxypenta(meth)acrylate, ditrimethylolpropane tetra(meth)acrylate, diethylene glycol di(meth)acrylate, polyethylene glycol di(meth)acrylate, tripropylene glycol di(meth)acrylate, and polypropylene glycol di(meth)acrylate.

Here, examples of a monovalent unsaturated organic compound include: methyl (meth)acrylate, ethyl (meth)acrylate, propyl (meth)acrylate, butyl (meth)acrylate, 2-ethylhexyl (meth)acrylate, isodecyl (meth)acrylate, lauryl (meth)acrylate, stearyl (meth)acrylate, allyl (meth)acrylate, cyclohexyl (meth)acrylate, methylcyclohexyl (meth)acrylate, isobornyl (meth)acrylate, 2-hydroxyethyl (meth)acrylate, 2-hydroxypropyl (meth)acrylate, glycerol (meth)acrylate, glycidyl (meth)acrylate, benzyl (meth)acrylate, 2-ethoxyethyl (meth)acrylate, 2-(2-ethoxyethoxy)ethyl (meth)acrylate, butoxyethyl (meth)acrylate, 2-methoxyethyl (meth)acrylate, methoxydiethylene glycol (meth)acrylate, methoxytriethylene glycol (meth)acrylate, methoxypolyethylene glycol (meth)acrylate, 2-methoxypropyl (meth)acrylate, methoxydipropylene glycol (meth)acrylate, methoxytripropylene glycol (meth)acrylate, methoxypolypropylene glycol (meth)acrylate, polyethylene glycol (meth)acrylate, and polypropylene glycol (meth)acrylate.

As other additive agents, a matting agent may be incorporated. As a matting agent, inorganic particles having an average particle diameter of 0.1-5 μm are preferably used.

As such inorganic particles, one kind or two or more kinds in combination of silica, alumina, talc, clay, calcium carbonate, magnesium carbonate, barium sulfate, aluminum hydroxide, titanium dioxide or zirconium dioxide may be used.

The matting agent containing inorganic particles is desirably contained in a ratio of 2 mass parts or more, preferably 4 mass parts or more, and more preferably 6 mass parts or more, but 20 mass parts or less, preferably 18 mass parts or less, and more preferably 16 mass parts or less, in total solid content of 100 mass parts.

The bleedout preventing layer may contains a thermoplastic resin, a thermocurable resin, an ionizing radiation curable resin, and a photopolymerizable resin, beside a hard coat agent and matting agent.

Examples of such thermocurable resin include: cellulose derivatives such as acetyl cellulose, nitro cellulose, acetyl butyl cellulose, ethyl cellulose, and methyl cellulose; vinyl resins such as vinyl acetate and its co-polymer, vinyl chloride and its co-polymer, and vinylidene chloride and its co-polymer; acetal resins such as polyvinyl formal and polyvinyl butyral; acrylic resins such as acrylic resin and its co-polymer, methacrylic resin and its co-polymer; polystyrene resin, polyamide resin, linear polyester resin, and polycarbonate resin.

Examples of such thermoplastic resin include: thermoplastic urethane resin formed from acrylic polyol and isocyanate prepolymer, phenol resin, urea melamine resin, epoxy resin, unsaturated polyester resin, and silicone resin.

As an ionizing radiation curable resin, an ionizing radiation curable coating material containing one kind or two or more kinds of photopolymerizable prepolymers or monomers, which can be hardened by being irradiated with ionizing radiation (ultraviolet radiation or electron radiation) may be employed. As a photopolymerizable prepolymer, an acrylic prepolymer which has two or more acrylic groups in the molecule, and can form a three dimensional network structure by cross-linking polymerization is specifically preferably used. As such an acrylic prepolymer, for example, an urethane acrylate, a polyester acrylate, an epoxy acrylate, or a melamine acrylate may be used. As a photopolymerizable monomer, the polyvalent unsaturated organic compounds described above are applicable.

Examples of a photopolymerization initiator include: acetophenone, benzophenone, Michler's ketone, benzoin, benzyl methyl ketal, benzoin benzoate, hydroxycyclohexyl phenyl ketone, 2-methyl-1-(4-(methylthio)phenyl)-2-(4-morpholinyl)-1-propane, α-acyloxym ester, and thioxanthone.

The bleedout preventing layer as described above can be prepared as follows. A coating solution is prepared by mixing a hard coat agent, a matting agent, and other components if required, and a diluting solvent used when required. The prepared coating solution is coated on a surface of a substrate film with a conventionally known method. Then it is cured by irradiation with an ionization radiation rays. As a method of irradiation with an ionization radiation rays, it is irradiated with ultraviolet rays in the range of 100-400 nm, or preferably, in the range of 200-400 nm emitted from: a super-high-pressure mercury lamp, a high-pressure mercury lamp, a low-pressure mercury lamp, a carbon ark, or a metal halide lamp.

A thickness of the bleedout preventing layer of the present invention is preferably 1-10 μm, and more preferably, it is 2-7 μm. By making it to be 1 μm or more, it becomes easy to achieve sufficient heat resistivity as a film. By making it to be 10 μm or less, it becomes easy to adjust the balance of optical properties of the smooth film, and at the same time, it become easy to suppress curl of the smooth film when the smooth layer is provided on only one side of the transparent polymer film.

<<Packaging Form of Gas Barrier Film>>

The gas barrier film of the present invention can be continuously produced and wound in a roll form (so-called, roll-to-roll production). In that occasion, it is preferable to wind up by pasting a protection sheet on the side formed with a gas barrier layer. In particular, when the gas barrier film of the present invention is used for a sealing material of an organic thin layer device, it often occur cases in which defect is produced by a dust (a particle) adhered to a surface. It is very effective to paste a protection sheet in a place of high cleanness to prevent adhesion of a dust. It is effective in prevention of the scratch to the gas barrier layer surface which may be introduced at the time of winding.

Although a protection sheet is not limited in particular, it can be used a common "protection sheet" or "peeling sheet" having a composition of a resin substrate having a thickness of about 100 μm provided with a adhesion layer of weak tackiness.

<<Measuring Method of Gas Barrier Film Properties>>

Each property of gas barrier film of the present invention can be measured according to the following method.

<<Measurement of Water Vapor Transmission Rate>>

For the measurement of water vapor transmission rate by the method described in JIS K 7129B, various methods have been proposed. For example, the representative methods are: a cup method, a dry sensor method (Lassy method) and an infrared sensor method (Mocon method). With increasing a gas barrier property, there are cases of reaching a measurement limit by these methods, and the following methods are also proposed.

<Measuring Method of Water Vapor Transmission Rate Other than the Above-Mentioned Methods>>

1. Ca Method

A method in which metal Ca is vapor deposited on a gas barrier film to utilize a corrosion phenomenon of the metal Ca by transmitted water vapor through the film. The water vapor transmission rate is calculated from the corrosion area and the time to achieve this.

2. Method Proposed by MORESCO, Ltd. (News Release on Dec. 8, 2009)

A method in which water vapor is transferred through a cooling trap between a sample space under an atmospheric pressure and a mass spectroscope under super-high vacuum condition.

3. HTO Method (General Atomics, Ltd. In the USA)

A method to calculate water vapor transmission rate using triplet hydrogen.

4. Method Proposal by A-Star in Singapore (WO 05/95924)

A method to calculate water vapor transmission rate from an electric resistance change and 1/f fluctuation component contained therein using a material (for example: Ca and Mg) which changes an electric resistance by water vapor or oxygen.

In the gas barrier film of the present invention, although a measuring method of water vapor transmission rate is not limited in particular, the following Ca method was used for determining water vapor transmission rate in the present invention.

<Ca Method Used in the Present Invention>

Vapor deposition apparatus: Vacuum deposition apparatus JEE-400 made by JEOL, Ltd.

Constant temperature and humidity oven: Yamato Humidic Chamber IG 47 M

Corroded metal reacted with water: calcium (particle)

Water vapor impermeable metal: aluminium (diameter: 3 to 5 mm, particle)

Preparation of water vapor barrier evaluation cell:

A gas barrier layer surface of a barrier film sample is provided with a mask except on a portion of the barrier film sample which is required to be vapor deposited (9 places of 12 mm×12 mm) and metal calcium was vapor deposited thereon using a vacuum deposition apparatus (JEE-400 made by JEOL, Ltd.).

Then, the mask was removed with keeping the vacuum condition, and aluminium was deposited from another metal vapor deposition source on a whole one surface of the sheet. After sealing with aluminium, the vacuum condition was removed. Under a dry nitrogen gas atmosphere, a quartz glass having thickness of 0.2 mm was immediately faced with the aluminium sealing surface via an ultraviolet curing resin for sealing (made by Nagase ChemteX Co., Ltd.), and ultraviolet rays were irradiated to produce an evaluation cell. In order to verify the change of the gas barrier property before and after bending, the barrier film which was not subjected to the above-described bending treatment was also used to prepare an evaluation cell for water vapor barrier property.

The prepare sample having two sealed surfaces was kept under a high temperature and a high humidity (60° C., 90% RH). Based on a method described in JP-A No. 2005-283561, a water amount penetrated in the cell was calculated from the corroded amount of metal calcium.

In addition, in order to check that there was no transmission of the water vapor from other portion than the barrier film side, a comparative sample was used. This comparative sample was prepared by vapor depositing metal calcium on a quartz glass plate having a thickness of 0.2 mm instead of using a barrier film sample, and a high temperature and a high humidity (60° C. 90% RH) keeping test was done in the same manner. It was confirmed that the metal calcium corrosion was not produced even after 1,000 hours.

<<Organic Photoelectric Conversion Element>>

A gas barrier film of the present invention can be used as various sealing materials or sealing films. For example, it is used as a sealing film for an organic photoelectric conversion element.

Since the barrier film of the present invention is transparent, when it is used for an organic photoelectric conversion element, this barrier film can be used as a substrate and the element can be constructed so that sun light is introduced from this side. Namely, a transparent conductive layer such as an ITO layer can be provided as a transparent electrode to construct a resin substrate for an organic photoelectric conversion element. An organic photoelectric conversion element can be sealed off by: forming a porous semiconductor layer on an ITO transparent conductive layer use as an anode provided on a substrate; providing a cathode constituted of a metal layer to form an organic photoelectric conversion element; and laminating another sealing material (which may be the same as the above barrier film), followed by adhering the aforementioned barrier film substrate and the peripheral to seal off the element, whereby an adverse affect of the outside moisture or oxygen gas to the element can be prevented.

The resin substrate for an organic photoelectric inversion element is obtained by forming a transparent conductive film on the layer which has an inorganic compound of thus obtained barrier film.

Formation of a transparent conductive film can be conducted by using, for example, a vacuum evaporation method or a sputtering method. It can also be formed via a coating method, for example, by employing a sol-gel method using, for example, alkoxides of indium and tin. The thickness of a transparent conductive film is preferably 0.1 μm-1,000 nm.

Subsequently, an organic photoelectric conversion element using these barrier films and a resin substrate for an organic photoelectric conversion element obtained by forming a transparent conductive film on the barrier film will be explained.

[Sealing Film and Production Method Thereof]

The barrier film of the present invention can be used as a sealing film of a substrate in the present invention.

By using a barrier film of the present invention, it can be formed a transparent conductive layer on a bas barrier unit, and by making this to be an anode, a layer constructing an organic photoelectric conversion element is formed on the anode, a layer to be a cathode is laminated, and another barrier film is laminated thereon as a sealing film, followed by adhering.

Specifically, a metal foil on which resin laminate (a polymer film) is formed is preferably used as a sealing film for a purpose in which ejection of light is not expected (transparency is not required), although it cannot be used as a barrier film on the light ejecting side.

In the present invention, a metal foil means a foil or a film of a metal produced, for example, by rolling, and it is distinguished from a thin film of a metal formed via sputtering or vacuum evaporation, or from an electrically conductive film formed from a fluid electrode material such as an electrically conductive paste.

The metal element of a metal foil is not specifically limited, and cited may be a copper (Cu) foil, an aluminum (Al) foil, a gold (Au) foil, a brass foil, a nickel (Ni) foil, a titanium (Ti) foil, a copper alloy foil, a stainless steel foil, a tin (Sn) Foil and a high nickel-content-alloy foil. Among these various metal foils, an aluminum foil may be cited as a specifically preferable metal foil.

The thickness of a metal foil is preferably 6-50 μm. When the thickness is less than 6 μm, pin holes may occur in the metal foil depending on the used material, whereby necessary barrier property (for example, a moisture permeability or an oxygen permeability) may not be obtained. When the thickness exceeds 50 μm, a problem of a higher cost may occur, or the merit of using a film may be lost since the thickness of the photoelectric conversion element becomes large.

In a metal foil having a resin film (a polymer film) laminated thereon, the various materials described in "KINOUSEI HOUSOUZAIRYO NO SHINTENKAI (New development of functional wrapping materials)" (published by Toray Research Center, Inc.) may be used for the resin film, examples of which include: a polyethylene resin, a polypropylene resin, a polyethylene terephthalate resin, a polyamide resin, an ethylene-vinyl alcohol copolymer resin, an ethylene-vinyl acetate copolymer resin, an acrylonitrile-butadiene copolymer resin, a cellophane resin, a vinylon resin and a vinylidene chloride resin. Resins such as a polypropylene resin and a nylon resin may be stretched, or, further, may be coated with a vinylidene chloride resin. With respect to a polyethylene resin, a low density resin or a high density resin can be used.

Although will be mentioned later, as a method to seal two films, for example, a resin layer which can be thermally fused using a commonly used impulse sealer is laminated, and sealed using an impulse sealer by fusing. In this case, the thickness of a barrier film is preferably 300 μm or less since the handling property of the films and the thermal fusing property, for example, using an impulse sealer becomes more difficult in a sealing process of barrier films.

[Sealing of Organic Photoelectric Conversion Element]

In the present invention, an organic photoelectric conversion element can be sealed off by: forming each layer of an organic photoelectric conversion element on a resin substrate for an organic photoelectric conversion element obtained by forming a transparent conductive layer on a resin film (a barrier film) having a layer containing the aforementioned inorganic compound according to the present invention; and covering the cathode surface with the aforementioned sealing film under a purged circumstance with an inert gas.

As an inert gas, a rare gas such as He or Ar is preferably used besides $N_2$. A rare gas obtained by mixing He and Ar is also preferably used. The ratio of a rare gas in the gas phase is preferably 90-99.9 volume %. The storage stability of the organic photoelectric conversion element is improved by sealing under a purged circumstance with an inert gas.

When an organic photoelectric conversion element is sealed using the aforementioned metal foil laminated with a resin film (a polymer layer), it is preferable that a layer containing an inorganic compound is formed on a metal foil, and the surface of the layer containing an inorganic compound is adhered onto the cathode, but not the surface of the resin film laminated on the metal foil. When the polymer layer side is adhered onto the cathode, it may occasionally happen that electrical conduction partially occurs.

As the method to adhere a sealing film onto the cathode of an organic photoelectric conversion element, cited may be a method to laminate a film which is commonly used and can be thermally fused using an impulse sealer, for example, an ethylene-vinyl acetate copolymer (EVA) film, a polypropylene (PP) film or a polyethylene (PE) film, followed by sealing using an impulse sealer by fusing.

As an adhesion method, a dry lamination method is excellent in view of workability. In this method, a curable adhesives layer of about 1.0-2.5 μm thick is generally used. However, since the adhesive may tunnel, bleed out or cause wrinkles by shrinking when the applied amount of the adhesive is too much, the applied amount of the adhesive is preferably adjusted within 3-5 μm as a dried film.

A hot melt lamination method is a method to melt a hot melt adhesive agent and apply onto a substrate to form an adhesive layer. In this method, the thickness of the adhesive layer can be selected in a wide range of 1-50 μm. As a base resin of a generally used hot melt adhesive agent, for example, EVA, EEA, polyethylene, and butyl rubber are usable. Also, for example, rosin, a xylene resin, a terpene resin or a styrene resin is used as an adhesiveness providing agent, and, for example, a wax is used as a plasticizer.

The extrusion lamination method represents a method to apply a resin melted at a high temperature onto a substrate using a die. In this method, it is possible to select the thickness of the resin layer within a wide range of 1-50 μm.

As a resin used for the extrusion lamination method, for example, LDPE, EVA and PP are generally usable.

[Ceramic Layer]

In the gas barrier film of the present invention, when sealing an organic photoelectric conversion element, it can be additionally provided on the gas barrier film with a ceramic layer made of the compounds such as inorganic oxide, nitride, and carbide from the viewpoint of increasing a gas barrier property more.

Specific ceramic films are formed, for example, by: $SiO_x$, $Al_2O_3$, $In_2O_3$, $TiO_x$, ITO (Indium tin oxide), AlN, $Si_3N_4$, $SiO_x$, N, $TiO_xN$, and SiC.

The ceramic layer may be laminated by well-known techniques, such as sol-gel process, vapor-depositing method, CVD, PVD, and sputtering method.

For example, it can also be formed by the same way as formation of the second barrier layer using polysilazane. In this case, after applying the composite containing polysilazane and forming a coated layer of polysilazane, it can be formed by making it convert into ceramic.

Moreover, the ceramic layer concerning the present invention can be selectively formed by choosing conditions of ingredients (it is also called as raw materials), such as an organometallic compound, decomposition gas, decomposition temperature, and injection electric power, in an atmospheric pressure plasma method. It can be selectively formed by choosing a metallic oxide mainly composed of silicon oxide, and a mixture of metallic carbide, metallic sulfide, and metallic halide (such as metallic oxynitride and metallic oxihalide).

For example, if a silicon compound is used as a raw material compound and oxygen is used for decomposition gas, a silicon oxide will be generated. Moreover, if silazane is used as a raw material compound, silicon oxynitride will be generated. The reason of this is as follows. In a plasma space, there exist very active charged particles and active radicals in a high density, as a result a chemical reaction of multi-steps will be extremely accelerated in a plasma space to result in being changed into a thermodynamically stable compound in an extremely short time.

As a raw material for forming this ceramic layer, as long as it is a silicon compound, any states of a gas, a liquid, and a solid under normal temperature and ordinary pressure may be used. When it is a gas, it can be introduced as it is in an electric discharge space, but when it is a liquid or a solid, it is used, making it evaporate by heating, babbling, a reduced pressure, ultrasonic irradiation, or other means. Moreover, it may be used by diluting with a solvent, and organic solvents such as methanol, ethanol, and n-hexane, and a mixed solvent thereof can be used as a solvent. In addition, since these diluting solvents are decomposed into a state of a molecule or an atom during a plasma electric discharge process, their influences can be almost disregarded.

Examples of such silicon compound include: silane, tetramethoxysilane, tetraethoxysilane, tetra-n-propoxysilane, tetra-iso-propoxysilane, tetra-n-butoxysilane, tetra-t-butoxysilane, dimethyldimethoxysilane, dimethyldiethoxsilane, diethyldimethoxysilane, diphenyldimethoxysilane, methyltriethoxysilane, ethyltrimethoxysilane, phenyltriethoxysilane, (3,3,3-trifluoropropyl)trimethoxysilane, hexamethyldisiloxane, bis(dimethylamino)dimethylsilane, bis(dimethylamino)methyl vinyl silane, bis(ethylamino)dimethylsilane, N,O-bis(trimethylsilyl)acetamide, bis(trimethylsilyl)carbodiimide, diethylaminotrimethylsilane, dimethylaminodimethylsilane, hexamethyldisilazane, hexamethylcyclotrisilazane, heptamethyldisilazane, nonamethyltrisilazane, octamethylcyclotetrasilazane, tetrakis dimethylaminosilane, tetra-isocyanate silane, tetramethyldisilazane, tri(dimethylamino)silane, triethoxyfluorosilane, allyldimethylsilane, allyltrimethylsilane, benzyltrimethylsilane, bis(trimethylsilyl)acetylene, 1,4-bistrimethylsilyl-1,3-butadiine, di-t-butylsilane, 1,3-disilabutane, bis(trimethylsilyl)methane, cyclopentadienyltrimethyl silane, phenyldimethylsilane, phenyltrimethylsilane, propargyltrimethylsilane, tetramethylsilane, trimethylsilyl acetylene, 1-(trimethylsilyl)-1-propyne, tris(trimethylsilyl)methane, tris(trimethylsilyl)silane, vinyl trimethylsilane, hexamethyldisilane, octamethylcyclotetra-siloxane, tetramethylcyclo-tetra-siloxane, hexamethylcyclo-tetra-siloxane, and M silicate 51.

Examples of a decomposing gas to produce a ceramic layer by decomposing a raw material gas containing silicon include: a hydrogen gas, a methane gas, an acetylene gas, a carbon oxide gas, a carbon dioxide gas, a nitrogen gas, an ammonia gas, a nitrous oxide gas, a nitrogen oxide gas, a nitrogen dioxide gas, an oxygen gas, water vapor, a fluorine gas, hydrogen fluoride, trifluoroalcohol, trifluorotoluene, hydrogen sulfide, sulfur dioxide, carbon disulfide, and a chlorine gas.

By suitably selecting: a raw material gas containing silicon; and a decomposing gas, it can be produced a ceramic layer containing silicon oxide, nitride or carbide.

In an atmospheric pressure plasma method, a discharge gas which easily becomes in a plasma state is mixed to these reactive gases, and the mixed gas is supplied in a plasma discharge generating apparatus. Examples of such discharge gas include: a nitrogen gas and/or an element of Group 18 of the periodic table. Specific gases used are: helium, neon, argon, krypton, xenon, and radon.

The above-described discharge gas is mixed with a reactive gas to form a thin film forming (mixture) gas. This gas is supplied in a plasma discharge generating apparatus (plasma generating apparatus) to form a thin film. Although a ratio of a discharge gas to a reactive gas depends on the property of the film to be obtained, the reactive gas is provided with setting a ratio of the discharge gas to be 50% or more with respect to the mixture gas.

In the laminated ceramic layer constituting the gas barrier resin substrate relating to the present invention, it can be obtained a ceramic layer mainly composed of silicon oxide of the present invention containing a silicon atom and at least one of O atom and N atom, by combining a predetermined ratio of oxygen gas or nitrogen gas with the above-described organic silicon compound.

As a thickness of the ceramic layer of the present invention, it is preferable in the range of 10-2,000 nm by considering a gas barrier property and transparency. Further, by considering also flexibility, and in order to achieve suitably balanced total properties, it is preferable to be 10-200 nm.

Subsequently, each layer of organic photoelectric conversion element materials (a constitution layer) constituting an organic photoelectric conversion element will be explained.

[Constitution of Organic Photoelectric Conversion Element and Solar Cell]

Preferable embodiments of an organic photoelectric conversion element relating the present invention will be explained, however, the present invention is not limited thereto.

The organic photoelectric conversion element is not specifically limited as far as it contains an anode, a cathode and at least one electric power generation layer (a mixed layer of a p-type semiconductor and an n-type semiconductor, also referred to as a bulk heterojunction layer or an i layer), and is an element which generates electricity when irradiated with light.

Preferable examples of the layer constitution of an organic photoelectric conversion element will be shown below.

(i) Anode/power generation layer/cathode
(ii) Anode/hole transport layer/power generation layer/cathode (iii) Anode/hole transport layer/power generation layer/electron transport layer/cathode
(iv) Anode/hole transport layer/p-type semiconductor layer/power generation layer/n-type semiconductor layer/electron transport layer/cathode
(v) Anode/hole transport layer/1st luminescence layer/electron transport layer/middle electrode/hole transport layer/2nd luminescence layer/electron transport layer/cathode The power generation layer needs to contain a p-type semiconductor material which can convey an electron hole, and an n-type semiconductor material which can convey an electron. These materials may form a heterojunction with substantially two layers or may form a bulk heterojunction with one layer inside of which is of a mixed state, while the bulk heterojunction is preferred in view of a higher photoelectric conversion efficiency. The p-type semiconductor material and the n-type semiconductor material will be described later.

As the same as the case of an organic EL element, the efficiency of taking out holes and electrons to the anode and the cathode, respectively, can be improved by sandwiching the power generation layer with a hole transport layer and an electron transport layer. Accordingly, the constitutions having those (namely, (ii) and (iii)) are more preferable. The power generation layer itself may also be of a constitution in which the power generation layer is sandwiched between a layer containing a p-type semiconductor material and a layer containing an n-type semiconductor material as shown in (iv) (also referred to as p-i-n constitution) in order to improve the rectification property of holes and electrons (namely, selectivity of carriers taken out). Further, in order to improve the utilization efficiency of the sunlight, it may be of a tandem constitution (layer constitution (V)) in which sun light of different wavelength can be absorbed by respective power generation layers.

Figure 2:
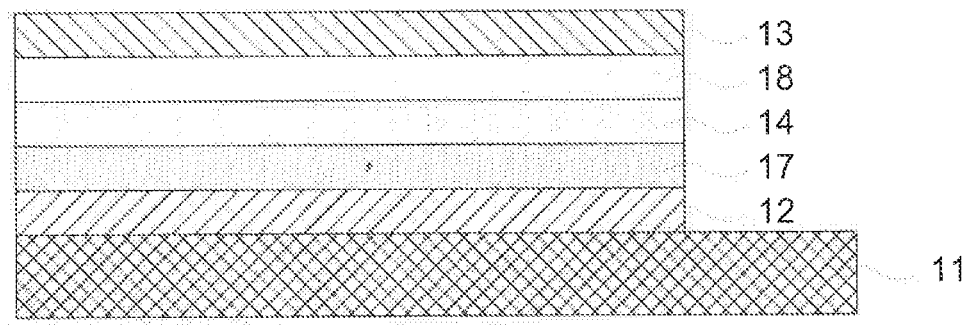
FIG. 2 is a cross-sectional view showing a solar cell having an organic photoelectric conversion element of a bulk heterojunction type.

For the purpose of improvement in a natural sunlight utilization factor (photoelectric conversion efficiency), it is possible to make a photoelectric conversion element having a composition of a back contact type in place of the sandwich structure in the photoelectric conversion element 10 shown in FIG. 2, the back contact type having a composition of forming a hole transport layer 14 and an electron transport layer 16 on a pair of comb dentate electrodes, and a photoelectric conversion section is arranged thereon.

A preferable embodiment of an organic photoelectric conversion element relating to the present invention will be described in the following.

FIG. 2 is a cross-sectional view showing an example of a solar cell having an organic photoelectric conversion element of a bulk heterojunction type. In FIG. 2, an organic photoelectric conversion element 10 of a bulk heterojunction type has a successively laminated structure on one surface of a substrate 11; a anode 12, a hole transport layer 17, a photoelectric conversion layer 14 of a bulk heterojunction type, an electron transport layer 18 and a cathode 13.

The substrate 11 is a member holding successively laminated members of: the anode 12, the photoelectric conversion layer 14 and the cathode 13. In this embodiment, since the incident light by which photoelectric conversion is carried out enters from the substrate 11 side, the substrate 11 is a member which enables to pass through this light by which photoelectric conversion is carried out i.e., it is a transparent member to the wave length of this light that should be carried out photoelectric conversion. As for the substrate 11, a glass substrate and a resin substrate are used, for example. This substrate 11 is not indispensable. For example, the organic photoelectric conversion element 10 of a bulk heterojunction type may be formed by forming the anode 12 and the cathode 13 on both surfaces of the photoelectric conversion layer 14.

The photoelectric conversion layer 14 is a layer which converts light energy into electric energy, and it is composed of a bulk heterojunction layer uniformly mixed with a p-type semiconductor material and an n-type semiconductor material. A p-type semiconductor material functions relatively as an electron donor (donor), and an n-type semiconductor material functions relatively as an electron acceptor (acceptor).

In FIG. 2, the incident light entering to the anode 12 through the substrate 11 is absorbed by an electron donor or an electron acceptor in the bulk heterojunction layer of the photoelectric conversion layer 14. An electron is transferred from the electron donor to the electron acceptor to form a pair of electron and hole (charge separation state). The generated electric charge is transported by an internal electric field, for example, the electric potential difference of the anode 12 and the cathode 13 when the work function of the anode 12 and the cathode 13 are different. An electron passes through electron acceptors, while a hole passes through electron donors, and the electron and the hole each are respectively transported to a different electrode, and a photocurrent is detected. For example, when the work function of the anode 12 is larger than the work function of the cathode 13, the electron is transported to the anode 12 and the hole is transported to the cathode 13. In addition, if the size of a work function is reversed, the electron and the hole will be transported to the reverse direction to that described above. Moreover, the transportation direction of an electron and a hole is also controllable by applying a potential between the anode 12 and the cathode 13.

In addition, although not described in FIG. 2, it may possible to have other layers, such as a hole blocking layer, an electron blocking layer, an electron injection layer, a hole injection layer, or a smoothing layer.

Figure 3:
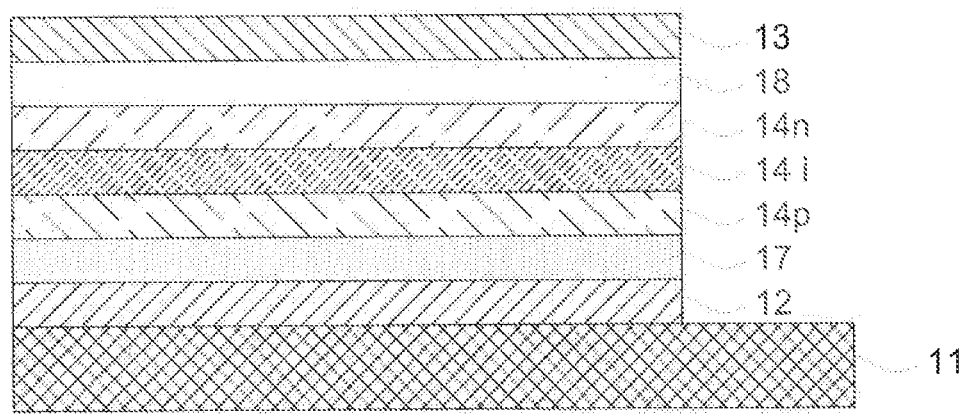
FIG. 3 is a cross-sectional view showing a solar cell having an organic photoelectric conversion element provided with tandem type bulk heterojunction photoelectric conversion layers.

More preferable structure is a structure in which the above-mentioned photoelectric conversion layer 14 is composed of three layered structure of so-called p-i-n structure (FIG. 3). The usual bulk heterojunction layer is a single layer 14*i* containing a p-type semiconductor material and an n-type semiconductor material mixed with each other. By sandwiching the 14*i* layer with a 14*p* layer composed of a p-type semiconductor material single substance and a 14*n* layer composed of an n-type semiconductor material single substance, the rectifying property of a hole and an electron becomes higher, the loss caused by the recombination of a hole and an electron which carried out charge separation is reduced, and still higher photoelectric conversion efficiency can be acquired by this structure.

Furthermore, it is also possible to make a tandem type structure produced by laminating a plurality of the aforesaid photoelectric conversion elements for the purpose of improving a sunlight utilization factor (photoelectric conversion efficiency).

Figure 4:
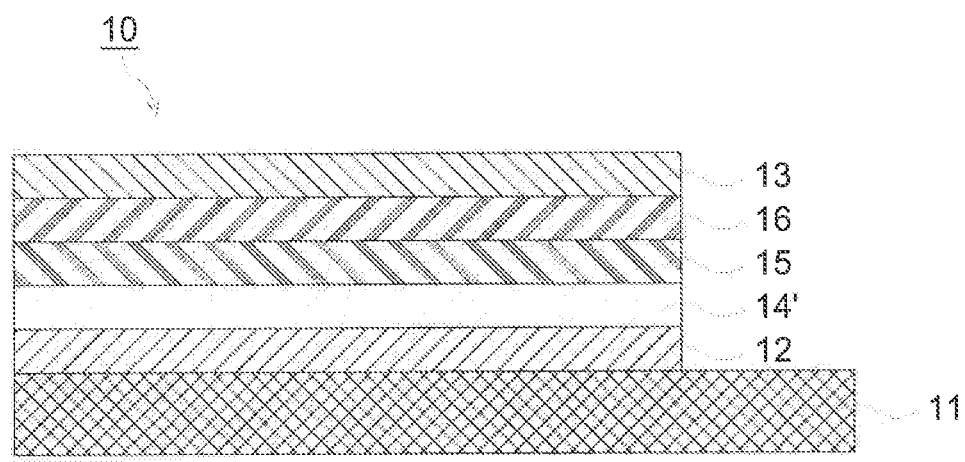
FIG. 4 is a cross-sectional view showing a solar cell having an organic photoelectric conversion element provided with tandem type bulk heterojunction photoelectric conversion layers.

FIG. 4 is a cross-sectional view showing a solar cell having an organic photoelectric conversion element containing bulk heterojunction layers of a tandem type. A tandem type structure can be made as follows. After laminating the anode 12 and the first photoelectric conversion layer 14' successively on the substrate 11, a charge recombination layer 15 is laminated. Then, a second photoelectric conversion layer 16 and the cathode 13 are laminated to achieve a tandem type structure. The second photoelectric conversion layer 16 may be a layer which absorbs the same spectrum as an absorption spectrum of the first photoelectric conversion layer 14', or it may be a layer which absorbs a different spectrum. Preferably, the second photoelectric conversion layer 16 absorbs a different spectrum from that of the first photoelectric conversion layer 14'. Moreover, both the first photoelectric conversion layer 14' and the second photoelectric conversion layer 16 may be three layered lamination structure of p-i-n as mentioned above.

Hereafter, composing materials of these layers will be described.

[Materials for Organic Photoelectric Conversion Element]

(p-Type Semiconductor Material)

In an Organic photoelectric conversion element of the present invention, as a p-type semiconductor material used for the photoelectron conversion layer (bulk heterojunction layer), various types of condensed polycyclic aromatic compounds and conjugated polymers and oligomers are cited.

Examples of a condensed polycyclic aromatic low molecular weight compound include: anthracene, tetracene, pentacene, hexacene, heptacene, chrysene, picene, fulminene, pyrene, peropyrene, perylene, terylene, quoterylene, coronene, ovalene, circumanthracene, bisanthene, zethrene, heptazethrene, pyanthrene, violanthene, isoviolanthene, circobiphenyl, anthradithiophene; porphyrin, copper phthalocyanine; tetrathiafulvalene (TTF)-tetracyanoquinodimethane (TCNQ) complex, bisethylenetetrathiafulvalene (BEDT-TTF)-perchloric acid complex; and a derivative of a precursor thereof.

As examples of a derivative containing a condensed polycyclic compound include: pentacene compounds having a substituent disclosed in WO 03/16599, WO 03/28125, U.S. Pat. No. 6,690,029, and JP-A No. 2004-107216; pentacene precursors disclosed in US 2003/136964; substituted acenes and their derivatives disclosed in J. Amer. Chem. Soc., vol. 127, No. 14, p. 4986, J. Amer. Chem. Soc., vol. 123, p. 9482, and J. Amer. Chem. Soc., vol. 130, No. 9, p. 2706.

Examples of a conjugated polymer include: polythiophene such as 3-hexylthiohene (P3HT) and its oligomer, polythiophene having a polymerizable group disclosed in Technical Digest of the International PVSEC-17, Fukuoka, Japan, 2007, P. 1225, polythiophene-thienothiphene copolymer disclosed in Nature Material, Vol. 5, p. 328 (2006), polythiophene-diketopyrrolopyrrole copolymer disclosed in WO 2008/000664, polythiophene-thiazolothiazole copolymer disclosed in Adv. Mat., p. 4160 (2007), polythiophene copolymer disclosed in Nature Material, Vol. 6, p. 497 (2007), polypyrrole and its oligomer, poly aniline, polyphenylene and its oligomer, polyphenylene vinylene and its oligomer, poly thienylene vinylene and its oligomer, polyacethylene, polydiacetylene, a conjugated polymers such as polysilane and polygerman.

Suitably usable oligomers rather than polymers are: thiophene hexamers such as: α-sexithionene, α,ω-dihexyl-α-sexithionene, α,ω-dihexyl-α-quinquethionene, and α,ω-bis (3-butoxypropyl)-α-sexithionene.

Among these, preferred are compounds which has a sufficient high solubility to an organic solvent to be able to carry out a solution process, and which forms a crystalline thin film and can realize a high mobility after drying.

When an electron transporting layer is formed on an photoelectric conversion layer with a coating method, since there may occur the problem that the solution for the electron transporting layer may dissolve the photoelectric conversion layer, it can be used a material which will become insoluble after forming a layer with a solution process.

Examples of such materials include: a polythiophene compound having a polymerizable group which becomes insoluble through cross-linked polymerization after being coated as described in Technical Digest of the International PVSEC-17, Fukuoka Japan, 2007, p. 1225; a compound having a solubilizing group which becomes insoluble (becomes to a pigment) by addition of thermal energy as described in US 2003/136964 and JP-A No. 2008-16834.

(n-Type Semiconductor Material)

There is no limitation in particular to an n-type semiconductor material used in the bulk heterojunction layer. Examples of such n-type semiconductor material include: fullerene, octaazaporphyrin, a perfluoro compound of a p-type semiconductor (perfluoropentacene and perfluorophthalocyanine), a polymer compound which contains an aromatic carboxylic acid anhydride and its imide in the structure, such as naphthalenetetracarboxylic anhydride, naphthalenetetracarboxylic diimide, perylenetetracarboxylic anhydride, and perylenetetracarboxylic diimide.

Among them, a fullerene derivative is most preferably used since it can be expected high charge separation ability (high-speed electron injection at a speed of 50 fs) with an interaction with a p-type semiconductor material. Examples of a fullerene derivative include: fullerene $C_{60}$, fullerene $C_{70}$, fullerene $C_{76}$, fullerene $C_{78}$, fullerene $C_{84}$, fullerene $C_{240}$, fullerene $C_{540}$, mixed fullerene, fullerene nano-tube, multi layer nano-tube, mono layer nano-tube, and nano-horn (cone type) and a fullerene derivative a part of which is substituted with a hydrogen atom, a halogen atom, a substituted or unsubstituted alkyl group, alkenyl group, alkynyl group, aryl group, heteroaryl group, cycloalkyl group, silyl group, ether group, thioether group, or amino group.

Among these, it is preferable to use a fullerene derivative which has an improved solubility by an introduction of a substituent. Examples thereof are: [6,6]-phenyl C61-butyric acid methyl ester (abbreviated name PCBM), [6,6]-phenyl C61-butyric acid n-butyl ester (PCBnB), [6,6]-phenyl C61-butyric acid isobutyl ester (PCBiB), [6,6]-phenyl C61-butyric acid n-hexyl ester (PCBH), bis-PCBM described in Adv. Mater., Vol. 20 (2008), p. 2116, amino fullerene described in JP-A No. 2006-199674, metallocene fullerene described in JP-A No. 2008-130889, and fullerene containing a cyclic ether group described in U.S. Pat. No. 7,329,709.

(Hole Transport Layer•Electron Blocking Layer)

A photoelectric conversion element 10 of the present invention preferably has a hole transport layer 17 between a bulk heterojunction layer and an anode, since the hole transport layer 17 enables to take out effectively the charge generated in the bulk heterojunction layer.

As materials used for these layers, for example, used for a hole transport layer, examples are: PBDOT-PSS (Baytran™ P, made by Starck-V Tech Co., Ltd.), polyaniline and their dope materials, and cyan compounds described in WO 2006/019270.

In addition in a hole transport layer having a shallower LUMO level than the LUMO level of n-type semiconductor material used for a bulk heterojunction layer, an electron block function is given which has an electron rectifying effect enabling of preventing the generated electrons in the bulk heterojunction layer from flowing to an anode side. This kind of electron transport layer is called as an electron blocking layer. It is preferable to use the electron transport layer having this function. Examples of these materials are: a triarylamine disclosed in JP-A No. 5-271166, metal oxides such as molybdenum oxide, nickel oxide and tungsten oxide. Moreover, the layer which is made of a single p-type semiconductor material and used for a bulk heterojunction layer can also be used. As a method to form these layers, although it may be used a vacuum deposition method and a solution coating method, it is preferable to use a solution applying method. Before forming a bulk heterojunction layer, it is preferable to form a coated film as an underlaying layer in order to obtain the effect of leveling so that to decrease the leak.

(Electron Transport Layer•Hole Blocking Layer)

A photoelectric conversion element 10 of the present invention preferably has an electron transport layer 18 between a bulk heterojunction layer and a cathode, since the electron transport layer 18 enables to take out effectively the charge generated in the bulk heterojunction layer.

As an electron transport layer 18, it can be used octaaza porphyrin, and a perfluoro compound of a p-type semiconductor (perfluoropentacene and perfluorophthalocyanine). Similarly, in an electron transport layer which has a deeper HOMO level than the HOMO level of a p-type semiconductor material used in a bulk heterojunction layer, it is provided with a hole blocking function having a rectification effect of preventing a hole generated in the bulk heterojunction layer from flowing to the cathode side. This kind of electron transport layer is also called as a hole blocking layer, and it is preferable to use an electron transport layer having this function. Examples of these materials are: n-type semiconductors of a phenanthrene compound such as bathocuproine, naphthalene tetracarboxylic acid anhydride, naphthalene tetracarboxylic acid diimide, perylene tetracarboxylic acid anhydride, and perylene tetracarboxylic acid diimide; n-type inorganic oxide of titanium oxide, zinc oxide, and gallium oxide; and alkali metal compounds of sodium fluoride, and cesium fluoride. Further, it can also be used a layer made of a single n-type semiconductor used in the bulk heterojunction layer. As a method for forming these layers, although any method of a vacuum deposition method and a solution coating method can be used, a preferably used method is a solution coating method.

(Other Layers)

A photoelectric conversion element of the present invention may have a composition containing various kinds of inter layers in the element for the purpose of improving energy conversion efficiency or increase of lifetime of an element. Examples of the inter layer include: a hole blocking layer, an electron blocking layer, a hole injection layer, an electron injection layer, an exciton blocking layer, a UV absorbing layer, a light reflective layer, and a wavelength changing layer.

(Transparent Electrode: First Electrode)

In a photoelectric conversion element of the present invention, a transparent electrode may be any one of cathode and anode. It may be selected according to the composition of the photoelectric conversion element. Preferable, a transparent electrode is used for a cathode. For example, when it is used for a cathode, preferable it is an electrode transmitting a light of 380-800 nm. Examples of a material which can be used include: transparent metal oxides of indium tin oxide (ITO), $SnO_2$, and ZnO; metal thin film of gold, silver, and platinum; a metal nanowire; and a carbon nanotubes.

Further, it can be used a conductive polymer selected from the group consisting of derivatives of: polypyrrole, polyaniline, polythiophene, polythienylene vinylene, polyazulene, polyisothianaphthene, polycarbazole, polyacethylene, polyphenylene, polyphenylene vinylene, polyacene, polyphenylacetylene, polydiacetylene, and polynaphthalene.

(Counter Electrode: Second Electrode)

The counter electrode may be an independent layer made of a conductive material, in addition to the material which has conductivity, it may be uses a resin which holds such material together. As a conducting material used for a counter electrode, it can be used: a metal, an alloy, an electric conductive compound, and a mixture thereof, which has a small work function (less than 4 eV). Specific examples of such electrode material include: sodium, a sodium potassium alloy, magnesium, lithium, a magnesium/copper mixture, a magnesium/silver mixture, a magnesium/aluminum mixture, a magnesium/indium mixture, an aluminum/aluminium oxide ($Al_2O_3$) mixture, indium, a lithium/aluminium mixture and a rare earth metal. Among these, from the viewpoint of an electron taking out property and resistivity to oxidation, a mixture of these metals and the second metal having a larger work function than these metals is suitable. Examples of these are: a magnesium/silver mixture, a magnesium/aluminum mixture, a magnesium/indium mixture, an aluminum/aluminium oxide ($Al_2O_3$) mixture, a lithium/aluminum mixture and aluminium. A counter electrode can be produced by using these electrode materials with a method such as a vacuum evaporation method or a sputtering method. Moreover, the coating thickness is usually chosen from the range of 10 nm to 5 μm, and preferably it is chosen from the range of 50 to 200 nm.

When a metallic material is used as a conducting material of a counter electrode, the light arriving at the counter electrode will be reflected and will be also reflected by the first electrode side, and this light can be reused. As a result, the light is again absorbed by the photoelectric conversion layer to result in improvement of photoelectric conversion efficiency. This is desirable.

Moreover, a counter electrode 13 may be nanoparticles, nanowires, or a nanostructure material which is made of a metal (for example, gold, silver, copper, platinum, rhodium, ruthenium, aluminium, magnesium and indium) and carbon. When it is a dispersion of nanowires, a transparent and high conductive counter electrode can be formed by a coating method, and it is desirable.

When the counter electrode side is made to be light transparent, it can be achieved as follows. After producing thin film of a conductive material suitable for counter electrodes, such as an aluminium, an aluminum alloy, silver or a silver compound to have a coating thickness of about 1 to 20 nm, a light transmitting counter electrode can be prepared by providing on the thin film with the membrane of a conductive light transparent material cited in the description of the above-mentioned transparent electrode.

(Intermediate Electrode)

As a material required for an intermediate electrode for a tandem structure as described in (v) (or in FIG. 4), it is preferable to use a layer having both transparency and conductivity, and it can be used the materials used for the aforesaid transparent electrode (a transparent metal oxide such as ITO, AZO, FTO, and titanium oxide; very thin film of Ag, Al, and Au, for example; a layer attaining nanoparticles or nanowires; a conductive polymer such as PEDOT:PSS and polyaniline).

Among the aforesaid hole transport layer and the electron transport layer, there is a combination which acts as an intermediate electrode (a charge recombination layer) when suitably combined and laminated. By making this structure, it can reduce a step to form one layer and this is preferable.

(Metal Nanowires)

In an organic photoelectric conversion element of the present invention, it can be uses a conductive fiber. As a conductive fiber, it can be used the followings: an organic or inorganic fiber which is coated with a metal, a conductive metal oxide fiber, a metal nanowire, a carbon fiber and a carbon nanotube. Among them, a metal nanowire is preferably used.

Generally, metal nanowires indicate a linear structure composed of a metallic element as a main structural element. In particular, the metal nanowires in the present invention indicate a linear structure having a diameter of a nanometer (nm) size.

In order to form a long conductive path by one metal nanowire, a metal nanowire according to the present invention is preferably have an average length of 3 μm or more, more preferably it is 3-500 μm, and still more it is 3-300 μm. In addition, the relative standard deviation of the length of the conductive fibers is preferably 40% or less. Moreover, from a viewpoint of transparency, a smaller average diameter is preferable, on the other hand, a larger average diameter is preferable from a conductive viewpoint. In the present invention, 10-300 nm is preferable as an average diameter of metal nanowires, and it is more preferable to be 30-200 nm. Further, the relative standard deviation of the diameter is preferably to be 20% or less.

There is no restriction in particular to the metal composition of the metal nanowire of the present invention, and it can be composed of one sort or two or more metals of noble metal elements or base metal elements. It is preferable that it contains at least one sort of metal selected from the group consisting of noble metals (for example, gold, platinum, silver, palladium, rhodium, iridium, ruthenium and osmium), iron, cobalt, copper and tin. It is more preferable that silver is included in it at least from a conductive viewpoint. Moreover, for the purpose of achieving compatibility of conductivity and stability (sulfidation resistance and oxidation resistance of metal nanowire and migration resistance of metal nanowire), it is also preferable that it contains silver and at least one sort of metal belonging to the noble metal except silver. When the metal nanowire of the present invention contains two or more kinds of metallic elements, metal composition may be different between the surface and the inside of metal nanowire, and the whole metal nanowire may have the same metal composition.

In the present invention, there is no restriction in particular to the production means of metal nanowires. It is possible to prepare metal nanowires via various methods such as a liquid phase method or a gas phase method. For example, the manufacturing method of Ag nanowires may be referred to Adv. Mater. 2002, 14, 833-837 and Chem. Mater., 2002, 14, 4736-4745; a manufacturing method of Au nanowires may be referred to JP-A No. 2006-233252; the manufacturing method of Cu nanowires may be referred to JP-A No. 2002-266007; while the manufacturing method of Co nanowires may be referred to JP-A No. 2004-149871. Specifically, the manufacturing methods of Ag nanowires, described in Adv. Mater., 2002, 14, 833-837 and Chem. Mater., 2002, 14, 4736-4745, may be preferably employed as a manufacturing method of the metal nanowires according to the present invention, since via those methods, it is possible to simply prepare a large amount of Ag nanowires in an aqueous system and the electrical conductivity of silver is highest of all metals.

In the present invention, a three-dimensional conductive network is formed by mutual contact of nanowires and high conductivity is achieved. By this, a light can penetrate the window part of the conductive network where metal nanowires do not exist and further, it becomes possible to perform efficiently the generation of electricity by the scattering effect of the metal nanowires in the organic photoelectric conversion layer portion. When the metal nanowires are arranged in the near place of the organic electric generating section in the first electrode, this light scattering effect can be effectively utilized and it is a preferable embodiment.

(Optical Function Layer)

The organic photoelectric conversion element of the present invention may be provided with a various types of optical function layers for the purpose of efficient light receiving of sunlight. As an optical function layer, there may be provided with an anti-reflection layer, a light condensing layer such as a microlens array, a light diffusion layer which can scatter the light reflected by the cathode and can make the light enter again in a photoelectric conversion layer.

As an anti-reflection layer, well-known anti-reflection layer can be prepared. For example, when a transparent resin film is a biaxial stretching polyethylene terephthalate film, it is preferable to set the refractive index of the adhesion assisting layer, which is adjacent to the film, to be 1.57 to 1.63, This will improve transmittance with decreasing the interface reflection between the film substrate and the adhesion assisting layer. As a way of adjusting a refractive index, it can be carried out by adjusting suitably the ratio of a binder resin to oxide sol having a comparatively high refractive index such as a tin oxide sol and a cerium oxide sol and by coating it. Although a single layer of adhesion assisting layer may be sufficient, in order to raise adhesion property, a composition of two or more adhesion assisting layers may be used.

As a light collection layer, it can be provides as follows: for example, to arrange a structure of a micro-lens array shape on the sun-light receiving side of the substrate or to make a combination with a so-called light collection sheet to result in increasing an amount of light from the specific direction, or to result in decreasing an incident angle dependency of a sunlight.

In an example of the micro-lens array, square pyramids to realize a side length of 30 μm and an apex angle of 90 degrees are two-dimensionally arranged on the light extraction side of the substrate. The side length is preferably 10 μm-100 μm. When it is less than the lower limit, coloration occurs due to generation of diffraction effects, while when it exceeds the upper limit, the thickness increases undesirably.

Moreover, as a light scattering layer, a various types of anti-glare layers and a layer in which are distributed nanoparticles or nanowire made of metal or various inorganic oxides in a colorless transparent polymer can be cited.

(Film Production Method and Surface Treatment Method)

<Formation Method of Various Layers>

As a formation method of a bulk heterojunction layer mixed with an electron acceptor and an electron donor, a transport layer and an electrode, a vacuum deposition method and a coating method (including a cast method and a spin coat method) can be cited. Among these, as a formation method of a bulk heterojunction layer, a vacuum deposition method and a coating method (including a cast method and a spin coat method) can be cited. Among these, a coating method is preferable in order to increase the area of the interface which carries out charge separation of the above-mentioned hole and electron and to produce an element having high photoelectric conversion efficiency. Moreover, the coating method is excellent also in production velocity.

Although there is no restriction in the coating method to be used, examples of the methods are cited as: a spin coat method, a cast method from a solution, a dip coat method, a blade coat method, a wire bar coat method, a gravure coat method and a spray coat method. In addition, it can be used the pattering method using printing methods such as: an inkjet method, a screen printing method, a typographic printing method, an intaglio printing method, an offset printing method and a flexography method.

After coating, it is preferable to heat the film in order to remove the residual solvent, water and a gas, as well as to improve the mobility and to make the absorption in the longer wavelength by crystallization of a semiconductor material. When an annealing treatment is carried out at a prescribed temperature during a manufacturing process, aggregation or crystallization is microscopically promoted and a suitable phase separation structure can be made in a bulk heterojunction layer. As a result, the carrier mobility of a bulk heterojunction layer can be improved and high efficiency can be obtained.

The photoelectron conversion layer (bulk heterojunction layer) 14 may be a single layer containing a uniform mixture of an electron acceptor and air electron donor. It may be a multiplicity of layers each changing the mixing ratio of an electron acceptor and an electron donor.

(Patterning)

In the production of air organic photoelectric conversion element of the present invention, the method to carry out patterning of the power generation layer, the hole transport layer and the electron transport layer is not specifically limited, and a method well known in the ad may be appropriately employed.

If the material for coating such as a bulk heterojunction layer or a transport layer is a soluble material, coating via a whole layer coating method such as a the coat method or a dip coat method may be conducted, followed by wiping off unnecessary portion, or direct patterning may be conducted via, for example, an inkjet method or a screen printing method.

In the case of an insoluble material, for example, an electrode material, patterning may be conducted via a method well known in the art, for example, by conducting vacuum evaporation using a mask when the electrode is accumulated under vacuum, or by conduction an etching method of a lift off method. Further, patterning may be conducted by transferring a pattern formed on a different substrate.

As describe above, the compositions of an organic photoelectron conversion element and a solar cell were described as examples of a gas barrier film of the present invention. However, the application of the gas barrier film of the present invention is not limited to them, it can be favorably used for other devices such as an organic EL element.

EXAMPLES

Hereafter, the present invention will be described specifically by referring to examples, however, the present invention is not limited to them. In Examples, the term "%" is used. Unless particularly mentioned, this represents "mass parts" or "mass %".

Example 1

Preparation of Sample 1 (Gas Barrier Film)

[Formation of First Barrier Layer 1]

By using an atmospheric pressure plasma film forming apparatus (described in FIG. 3 of JP-A No. 2008-56967, Atmospheric pressure plasma CVD apparatus of roll to roll type), a first barrier layer 1 (100 nm) was formed with an atmospheric pressure plasma method on a transparent resin substrate (polyethylene terephthalate (PET) film provided with a clear hard coat layer (CHC) having a thickness of PET of 125 μm and a thickness of CMC of 6 μm, made by Kimoto Co., Ltd.). The thin film forming conditions used are shown below.

(Mixed Gas Composition)

Discharge gas: nitrogen gas, 94.9 volume %
Thin film forming gas: tetraethoxysilane, 0.1 volume %
Additive gas: oxygen gas, 5.0 volume %

(Film Forming Conditions)

<First Electrode Side>
Type of power source: PHF-6, 100 kHz (continuous mode), made by HAIDEN LABORATORY, Co., Ltd.
Frequency: 100 kHz
Output density: 10 W/cm$^2$
Electrode temperature: 120° C.

<Second Electrode Side>
Type of power source: CF-5000-13M, 13.56 MHz, made by Pearl Corporation
Frequency: 13.56 MHz
Output density: 10 W/cm$^2$
Electrode temperature: 90° C.

The first barrier layer 1 formed according to the method described above was composed of silicon oxide ($SiO_2$).

[Formation of Second Barrier Layer 1]

On the first barrier layer 1 formed with the method described above was coated a dibutyl ether solution containing 10 mass % of perhydropolysilazane (PHPS, AQUAMICA NN120-10, non-catalysis type made by AZ Electronic Materials, Ltd.) with a wireless bar so that the dried average thickness of 0.10 μm to obtain a coated sample.

(First Step: Drying Treatment)

The obtained coated sample was treated under the condition of temperature 85° C. and humidity 55% RH for one minute to obtain a dried sample.

(Second Step: Dehumidification Treatment)

The dried sample was further kept under an atmosphere of temperature 25° C. and humidity 10% RH (due point: −8° C.) for 10 minute to perform a dehumidification treatment.

(Reforming Treatment A)

The sample having performed the dehumidification treatment was subjected to a reforming treatment under the following conditions to form a second barrier layer 1. The reforming treatment was done at a due point of −8° C.

<Reforming Treatment Apparatus>
Apparatus: Excimer irradiation apparatus MODEL: MECL-M-1-200, made by M. D. COM. Inc.
Wavelength: 172 nm
Enclosed gas in the lamp: Xe <Reforming Treatment Conditions>
The sample fixed on the movable stage was subjected to a reforming treatment under the following additions to form a second barrier layer 1.
Excimer light strength: 130 mW/cm$^2$ (172 nm)
Distance between the sample and the light source: 1 mm
Stage heating temperature: 70° C.
Oxygen density in the irradiation apparatus: 1.0%
Excimer irradiation time: 5 seconds A gas barrier film sample 1 was prepared by the method described above.

(Confirmation of Reformed Region)

The cross section of the prepared sample 1 was observed with TEM by using the method described later. As a result, it was continued that there existed a reformed region in the second barrier layer 1 from the surface to 30 nm in depth.

<<Preparation of Sample 2>>

[Formation of First Barrier Layer 2]

In the same manner as used for formation of the first barrier layer 1 in the above-described sample 1 except that the film formation conditions were changed as below, it was formed a first barrier layer 2 (100 nm) composed of silicon oxynitride.

(Mixed Gas Exposition)
  Discharge gas: nitrogen gas, 94.9 volume %
  Thin film forming gas: tetraethoxysilane, 0.1 volume %
  Additive gas: hydrogen gas, 1.0 volume %
(Film Forming Conditions)
<First Electrode Side>
  Type of power source: PHF-6k, 100 kHz (continuous mode), made by HAIDEN LABORATORY, Co., Ltd.
  Frequency: 100 kHz
  Output density: 12 W/cm$^2$
  Electrode temperature: 120° C.
<Second Electrode Side>
  Type of power source: CF-5000-13M, 13.56 MHz, made by Pearl Corporation
  Frequency: 13.56 MHz
  Output density: 12 W/cm$^2$
  Electrode temperature: 90° C.

The obtained unit barrier layer 2 was composed of silicon oxynitride (SiON), and the content ratio of nitrogen was 0.8% in element ratio.

[Formation of Second Barrier Layer 2]

On the first barrier layer 2 formed with the method described above was coated a dibutyl ether solution containing 10 mass % of perhydropolysilazane (PHPS, AQUA-MECA NN120-10, non-catalysis type made by AZ Electronic Materials, Ltd.) with a wireless bar so that the dried average thickness of 0.10 μm to obtain a coated sample.

(First Step: Drying Treatment)

The obtained coated sample was treated under the condition of temperature 65° C. and humidity 55% RH for one minute to obtain a dried sample.

(Second Step: Dehumidification Treatment)

The dried sample was further kept under an atmosphere of temperature 25° C. and humidity 10% RH (due point: −8° C.) for 10 minutes to perform a dehumidification treatment.

(Reforming Treatment A)

The sample having performed the dehumidification treatment was subjected to the same reforming treatment as done to form the second barrier layer 1 of the above-described sample 1 to result in forming a second barrier layer 2.

(Confirmation of Reformed Region)

The cross section of the prepared sample 2 was observed with TEM by using the method described later. As a result, it was confirmed that there existed a reformed region in the second barrier layer 2 from the surface to 30 nm in depth.

<<Preparation of Sample 3>>

[Formation of First Barrier Layer 3]

In the same manner as used for formation of the first barrier layer 1 in the above-described sample 1 except that the film formation conditions were changed as below, it was formed a first barrier layer 3 (100 nm) composed of silicon oxynitride.

(Mixed Gas Composition)
  Discharge gas: nitrogen gas, 94.9 volume %
  Thin film forming gas: tetraethoxysilane, 0.1 volume %
  Additive gas: hydrogen gas, 1.0 volume %
(Film Forming Conditions)
<First Electrode Side>
  Type of power source: PHF-6, 100 kHz (continuous mode), made by HAIDEN LABORATORY, Co., Ltd.
  Frequency: 100 kHz
  Output density: 12 W/cm$^2$
  Electrode temperature: 120° C.
<Second Electrode Side>
  Type of power source: CF-5000-13M, 13.56 MHz, made by Pearl Corporation
  Frequency: 13.56 MHz
  Output density: 12 W/cm$^2$
  Electrode temperature: 90° C.

The obtained first barrier layer 3 was composed of silicon oxy-nitride (SiON), and the content ratio of nitrogen was 0.8% in element ratio.

[Formation of Second Barrier Layer 3]

Subsequently, on the first barrier layer 3 formed with the method described above was coated a dibutyl ether solution attaining 10 mass % of perhydropolysilazane (PHPS, AQUA-MICA NN120-10, non-catalysis type made by AZ Electronic Materials, Ltd.) with a wireless bar so that the dried average thickness of 0.10 μm to obtain a coated sample.

(First Step: Drying Treatment)

The obtained coated sample was treated under the condition of temperature 85° C. and humidity 55% RH for one minute to obtain a dried sample.

(Second Step: Dehumidification Treatment)

The dried sample was further kept under an atmosphere of temperature 25° C. and humidity 10% RH (due point: −8° C.) for 10 minute to perform a dehumidification treatment.

(Reforming Treatment B)

The sample having performed the dehumidification treatment was subjected to a reforming treatment under the following conditions to form a second barrier layer 3. The reforming treatment was done at a due point of −8° C.

<Reforming Treatment Apparatus>
  Apparatus: Excimer irradiation apparatus MODEL: MECL-M-1-200, made by M. D. COM. Inc.
  Wavelength: 172 nm
  Enclosed gas in the lamp: Xe
<Reforming Treatment Conditions>

The sample fixed on the movable stage was subjected to a reforming treatment under the following conditions to form a second barrier layer 3.
  Excimer light strength: 130 mW/cm$^2$ (172 nm)
  Distance between the sample and the light source: 1 mm
  Stage heating temperature: 90° C.
  Oxygen density in the irradiation apparatus: 1.0%
  Excimer irradiation time: 3 seconds Sample 3 being a gas barrier film was prepared under the above-conditions.

The cross section of the prepared sample 3 was observed with TEM, As a result, it was confirmed that there was formed a reformed region from the surface of the second barrier layer 3 with a thickness of 60 nm.

<<Preparation of Sample 4>>

[Formation of First Barrier Layer 4]

By using a plasma CVD apparatus Model PD-270STP made by SAMCO inc., a first barrier layer 4 was formed on a transparent resin substrate (polyethylene terephthalate (PET) film provided with a clear hard coat layer (CHC) having a thickness of PET of 125 μm and a thickness of CHC of 6 μm, made by Kimoto Co., Ltd.).

(Thin Film Forming Conditions)
  Oxygen pressure: 53.2 Pa
  Reactive gas: tetraethoxysilane (TEOS), 5 sccm (standard cubic centimeter per minute), density 0.5%
  Electric power: 100 W at 13.56 MHz
  Substrate holding temperature: 120° C.

The obtained first barrier layer 4 was composed of silicon oxide (SiO$_2$).

[Formation of Second Barrier Layer 4]

Subsequently, the obtained first barrier layer 4 was subjected the same treatment as formation of the second barrier layer 1 to form a second barrier layer 4. Thus, a gas barrier film sample 4 was prepared.

The cross section of the prepared sample 4 was observed with TEM. As a result, it was confirmed that there was formed a reformed region from the surface of the second barrier layer 4 to a region of 30 nm in depth.

<<Preparation of Sample 5>>

[Formation of First Barrier Layer of 5]

By using a vacuum plasma CVD apparatus illustrated in FIG. 5, a SiON film was formed as a first barrier layer 5 on a transparent resin substrate (polyethylene terephthalate (PET) film provided with a clear hard coat layer (CHC) having a thickness of PET of 125 µm and a thickness of CHC of 6 µm, made by Kimoto Co., Ltd.).

The frequency of the high frequency power source used at this time was 27.12 MHz and the distance between the electrodes was set to be 20 mm.

As raw material gases, there were introduced a silane gas with a flow rate of 7.5 sccm, an ammonia gas with a flow rate of 100 sccm, and a nitrous oxide gas with a flow rate of 50 sccm in a vacuum chamber.

At the starting time of film formation, the temperature of the transparent resin substrate was set to 100° C. and the gas pressure was set to 100 Pa, and it was formed a silicon oxynitride thin film layer (SiON layer) containing silicon oxynitride as a main component with a thickness of 50 nm. Thus a first barrier layer 5 was formed.

The obtained first barrier layer 5 was composed of silicon oxynitride (SiON).

[Formation of Second Barrier Layer 5]

Subsequently, on the first barrier layer 5 formed with the method described above was coated a dibutyl ether solution containing 10 mass % of perhydropolysilazane (PHPS, AQUAMECA NN120-10, non-catalysis type made by AZ Electronic Materials, Ltd.) with a wireless bar so that the dried average thickness of 0.10 µm to obtain a coated sample.

(First Step: Drying Treatment)

The obtained coated sample was treated under the condition of temperature 95° C. and humidity 55% RH for one minute to obtain a dried sample.

(Second Step: Dehumidification Treatment)

The dried sample was farther kept under an atmosphere of temperature 25° C. and humidity 10% RH (due point: −8° C.) for 10 minute to perform a dehumidification treatment.

(Reforming Treatment B)

The sample having performed the dehumidification treatment was subjected to the same reforming treatment as done to form the second barrier layer 3 of the above-described sample 3 to result in forming a second barrier layer 5.

By the above method, a gas barrier film sample 5 was prepared.

<<Preparation of Sample 6>>

[Formation of First Barrier Layer 6]

By using a vacuum plasma CVD apparatus illustrated in FIG. 5, a SiN film was formed as a first barrier layer 6 on a transparent resin substrate (polyethylene terephthalate (PET) film provided with a clear hard coat layer (CHC) having a thickness of PET of 125 µm and a thickness of CHC of 6 µm, made, by Kimoto Co., Ltd.).

The frequency of the high frequency power source used at this time was 27.12 MHz and the distance between the electrodes was set to be 20 mm.

As raw material gases, there were introduced a silane gas with a flow rate of 7.5 sccm, an ammonia gas with a flow rate of 50 sccm, and a hydrogen gas with a flow rate of 200 sccm in a vacuum chamber.

At the starting time of film formation, the temperature of the transparent resin substrate was set to 100° C. and the gas pressure was set to 30 Pa, and it was formed a silicon nitride thin film layer ($Si_3N_{25}$ layer) containing silicon nitride as a main component with a thickness of 50 nm. Thus a first barrier layer 6 was formed.

[Formation of Second Barrier Layer 6]

A second barrier layer 6 was formed with the sane forming conditions as formation of the second barrier layer 5 in the above-described sample 5.

<<Preparation of Sample 7>>

[Formation of First Barrier Layer 7]

By using a vacuum plasma CVD apparatus illustrated in FIG. 5, a SiN film was formed as a first barrier layer 7 on a transparent resin substrate (polyethylene terephthalate (PET) film provided with a clear hard coat layer (CHC) hawing a thickness of PET of 125 µm and a thickness of CHC of 6 µm, made by Kimoto Co., Ltd.).

The frequency of the high frequency power source used at this time was 27.12 MHz and the distance between the electrodes was set to be 20 mm.

As raw material gases, there were introduced a silane gas with a flow rate of 7.5 sccm, an ammonia gas with a flow rate of 100 sccm, and a hydrogen gas with a flow rate of 150 sccm in a vacuum chamber.

At the starting time of film formation, the temperature of the transparent resin substrate was set to 100° C. and the gas pressure was set to 30 Pa, and it was formed a silicon nitride thin film layer ($Si_3N_4$ layer) containing silicon nitride as a main component with a thickness of 50 nm. Thus a first barrier layer 7 was formed.

[Formation of Second Barrier Layer 7]

A second barrier layer 7 was formed with the same forming conditions as formation of the second barrier layer 5 in the above-described sample 5.

<<Preparation of Sample 8>>

[Formation of First Barrier Layer 8]

A first barrier layer 8 was formed with the same forming conditions as formation of the first barrier layer 7 in the above-described sample 7.

[Formation of Second Barrier Layer 8]

A second barrier layer 8 was formed with the same forming conditions as formation of the second barrier layer 2 in the above-described sample 2.

<<Preparation of Sample 9>>

[Formation of First Barrier Layer 9]

A first barrier layer 9 (100 nm) containing silicon oxynitride was formed in the same manner as used for formation of the first barrier layer 1 in the sample 1.

[Formation of Second Barrier Layer 9]

A gas barrier film sample 9 was prepared by forming a second barrier layer 9 on the first barrier layer 9 in the same manner as used for formation of the sample 1, except that the reforming treatment A used for reforming the second barrier layer 1 in the sample 1 was replaced with the following reforming treatment C.

(Reforming Treatment C)

The sample having performed the dehumidification treatment was subjected to a plasma treatment under the following conditions to form a second barrier layer 9. The substrate holding temperature during film formation was set to 120° C.

The treatment was done using a roll electrode type discharge treatment apparatus. Plural rod electrodes, which were opposing a roll electrode, were arranged in a parallel direction to the film conveying direction. Gases and electric power were introduced to each of the electrode portions, and the treatment was suitably done so that the coated surface was irradiated with plasma for 20 seconds as described below.

In addition, as a dielectric substance which covered each of the above described electrodes in the plasma discharge treatment apparatus, it was used a substance covered with alumina on one side with a thickness of 1 mm to both opposing electrodes.

The distance of electrodes after covering was set to be 0.5 mm. Further, a mother metal covered with a dielectric substance has a form of stainless jacket which has a cooling function with cooling water. During the discharge, the treatment was done with carrying out an electrode temperature control by cooling water. The power sources employed were: High frequency power source (100 kHz) made by OYO Electric Co., Ltd.; and High frequency power source (13.56 MHz) made by Pearl Corporation.

Discharge gas: nitrogen gas
Reactive gas: 7% of oxygen gas based on the total gas
Lower frequency power source energy: 6 W/cm$^2$ of 100 kHz
Higher frequency power source energy: 10 W/cm$^2$ of 13.56 MHz
Plasma treatment time: 20 seconds The cross section of the prepared sample 9 was observed with TEM. As a result, it was confirmed that there existed a reformed region in the second barrier layer 9 from the surface to 10 nm in depth.

<<Preparation of Sample 10>>

[Formation of First Barrier Layer 10]

A first barrier layer 10 (100 nm) containing silicon oxynitride was formed in the same manner as used for formation of the first barrier layer 1 in the sample 1.

[Formation of Second Barrier Layer 10]

A gas barrier film sample 10 was prepared by forming a second barrier layer 10 on the first barrier layer 10 in the same manner as used for formation of the second barrier film 1 of the sample 1, except that during the formation of the second barrier layer in the sample 1, the thickness of the second barrier layer was made 0.06 μm and the reforming treatment A was replaced with the following reforming treatment D.

(Reforming Treatment D)

The sample having performed the dehumidification treatment was subjected to a reforming treatment under the following conditions to form a second barrier layer 10. The reforming treatment was done at a due point of −8° C.

<Reforming Treatment Apparatus>

The sample fixed on a movable stage was subjected to a reforming treatment under the following conditions.

UV light strength: 2,000 mW/cm$^2$
Distance between the sample and the light source: 30 mm
Stage heating temperature: 40° C.
Oxygen density in the irradiation apparatus: 5%
UV light irradiation time: 180 seconds The cross section of the prepared sample 10 was observed with TEM. As a result, it was confirmed that there existed a reformed region in the second barrier layer 10 from the surface to 55 nm in depth.

<<Preparation of Sample 11: Comparative Example>>

Under the conditions of Example 1 described in JP-A No. 2009-255040, two pieces of second barrier layers each having a thickness of 100 nm were laminated to form a sample 11. The cross section of the prepared sample 11 was observed with TEM. As a result, it was confirmed that there existed no reformed region.

<<Preparation of Sample 12: Comparative Example>>

Under the conditions of Example 1 described in Japanese Patent No. 3511325, a first barrier layer 12 (silicon oxide) having a thickness of 100 nm was formed with a plasma CVD method. Then, in the same manner, it was formed a second barrier layer 12 having a thickness of 100 nm on the formed first barrier layer 12 to prepare a sample 12. The cross section of the prepared sample 12 was observed with TEM. As a result, it was confirmed that there existed no reformed region.

<<Preparation of Sample 13: Comparative Example>>

A sample 13 was prepared in the same manner as used for preparation of a sample in Example described in JP-A No. 2008-235165, except that the flat film to be laminated as a barrier film was changed by applying a coating condition used for forming the second barrier layer 1 in the above-described sample 1, and the reforming treatment was done at 90° C. for 10 minutes. The cross section of the prepared sample 13 was observed with TEM. As a result, it was confirmed that there existed no reformed region.

<<Preparation of Sample 14>>

[Formation of First Barrier Layer 14]

A first barrier layer 14 was formal with the same forming conditions as formation of the first barrier layer 1 in the above-described sample 1.

[Formation of Second Barrier Layer 14]

A second barrier layer 14 was formed in the same manner as used for formation of the second barrier layer 1 in the above-described sample 1, except that, during the reforming treatment of the second barrier layer 1 in the above-described sample 1, the time for excimer irradiation was changed to 30 seconds so that the whole region of the second barrier layer was made to a reformed region.

<<Preparation of Sample 15>>

[Formation of First Barrier Layer 15]

A first barrier layer 15 was formed with the same forming conditions as formation of the first barrier layer 1 in the above-described sample 1.

[Formation of Second Barrier Layer 15]

A second barrier layer 15 was formed in the same manner as used for formation of the second barrier layer 1 in the above-described sample 1, except that, during the formation of the second barrier layer 1 in the above-described sample 1, hydrogenated silsesquioxane (HSQ) was used instead of perhydropolysilazane (PHPS).

<<Preparation of Sample 6>>

[Formation of First Barrier Layer 16]

A first barrier layer 16 was formed with the same forming conditions as formation of the first barrier layer 1 in the above-described sample 1.

[Formation of Second Barrier Layer 16]

A second barrier layer 16 containing silicon oxide was formed in the same manner as used for formation of the second barrier layer 1 in the above-described sample 1, except that the following change was done. In the formation of the second barrier layer 1 in the above-described sample 1, in accordance with the method described in Example 2 of Japanese Patent No. 4310784, it was coated with a sol-gel method a solution containing a mixture of TEOS (tetraethoxy silane)/water/IPA (isopropyl alcohol)/tertiary amine/γ-glycidoxypropyl trimethoxy silane hydrolysis product to result in a dried thickness of 100 nm. Then, the coated layer was subjected to heating treatment at 130° C. under the condition of obtaining a thickness of a reformed region of 30 nm.

<<Preparation of Sample 17>>

[Formation of First Barrier Layer 17]

By using an atmospheric pressure plasma film forming apparatus (described in FIG. 3 of JP-A No. 2008-56967, Atmospheric pressure plasma CVD apparatus of roll to roll type), a first barrier layer 17 (100 nm) was formed with an atmospheric pressure plasma method on a transparent resin substrate (polyethylene terephthalate (PET) film provided with a clear hard coat layer (CHC) having a thickness of PET of 125 μm and a thickness of CHC of 6 μm, made by Kimoto Co., Ltd.). The thin film forming conditions used are shown below.

(Mixed Gas Composition)
  Discharge gas: nitrogen gas, 94.9 volume %
  Thin film forming gas: tetraethoxysilane, 0.1 volume %
  Additive gas: oxygen gas, 5.0 volume %
(Film Forming Conditions)
<First Electrode Side>
  Type of power source: PHF-6, 100 kHz (continuous mode), made by HAIDEN LABORATORY, Co., Ltd.
  Frequency: 100 kHz
  Output density: 7 W/cm$^2$
  Electrode temperature: 120° C.
<Second Electrode Side>
  Type of power source: CF-5000-13M, 13.56 MHz, made by Pearl Corporation
  Frequency: 13.56 MHz
  Output density: 7 W/cm$^2$
  Electrode temperature: 90° C.

The first harder layer 17 formed according to the method described above was composed of silicon oxide ($SiO_2$), and a film density was 2.12 g/cm$^3$ (=D1) and uniform in the layer depth direction.

[Formation of Second Barrier Layer 17]

A second barrier layer 17 was formed with the same forming conditions as formation of the second barrier layer 3 in the above-described sample 3.

<<Measurement of Characteristic Values of Gas Barrier Film>>

With respect to each gas barrier film produced by the method mentioned above, the characteristic values were measured by the following ways.

[Measurement of Thickness of Reformed Region]

An ultra-thin slice was prepared from each gas barrier film produced by the method mentioned above using the following FIB processing apparatus. Then it was observed with TEM. When the sample is irradiated with an electron beam, there is produced a contrast difference between a damaged portion by the electron beam and a non-damaged portion. By measuring this portion, a thickness of a reformed portion 4A and a thickness of a non-reformed portion 4B were calculated.

(FIB Process)
  Apparatus: SMI 2050 made by SII Co., Ltd.
  Processing ion: Ga 30 kV
  Thickness of sample: 200 nm
(TEM Observation)
  Apparatus: JEM 2000FX (accelerating voltage: 200 kV)
  Electron beam irradiation time: 30 seconds

[Measurement of Elastic Modulus of Reformed Region 4A and Non-Reformed Region 4B in First Barrier Layer and Second Barrier Layer]

In the same manner as described above, a cross section of each gas barrier film was exposed by FIB processing. Then, by using Nano Indenter TMXP/DCM (made by MTS System Co., Ltd.), an ultra minute indenter of a triangular pyramid tip was pushed to the region of the cross section to measure elastic moduli of a reformed region and a non-reformed region in a first barrier layer and a second barrier layer

[Measurement of Film Density of Reformed Region 4A and Non-Reformed Region 4B in First Barrier Layer and Second Barrier Layer]

X-ray reflection ratio measuring apparatus: Thin film structure evaluation apparatus ATG-G (made by Rigaku Corporation)

X-ray source target: Copper (1.2 kW)

Measurement: X-ray reflection ratio curve is measured using a 4 crystal monochromatic meter to produce a model of a density distribution profile, then fitting is carried out to obtain a density distribution in a depth direction. By this, it was performed measurement of film density of a reformed region 4A and a non-reformed region 4B in first barrier layer and second barrier layer, and film density differences of (D1−D2), (D1−D3) and (D2−D3) were determined.

The forming conditions of each of the prepared gas barrier film as described above and the film thickness are shown in Table 1.

TABLE 1

| | | | | Second barrier layer | | | | |
| | | | | | Layer thickness (nm) | | Layer thickness | |
| Gas barrier film No. | Forming method of first barrier layer | Raw material | Reforming method | Total layer thickness | Reformed region | Non-reformed region | ratio of reformed region (%) | Remarks |
|---|---|---|---|---|---|---|---|---|
| 1 | *1 | PHPS | Excimer irradiation | 100 | 30 | 70 | 30 | Inv. |
| 2 | *1 | PHPS | Excimer irradiation | 100 | 30 | 70 | 30 | Inv. |
| 3 | *1 | PHPS | Excimer irradiation | 100 | 60 | 40 | 60 | Inv. |
| 4 | Vacuum CVD method ($SiO_2$) | PHPS | Excimer irradiation | 100 | 30 | 70 | 30 | Inv. |
| 5 | Vacuum CVD method (SiON) | PHPS | Excimer irradiation | 100 | 30 | 70 | 30 | Inv. |
| 6 | Vacuum CVD method ($Si_3N_{2.5}$) | PHPS | Excimer irradiation | 100 | 30 | 70 | 30 | Inv. |
| 7 | Vacuum CVD method ($Si_3N_4$) | PHPS | Excimer irradiation | 100 | 30 | 70 | 30 | Inv. |
| 8 | Vacuum CVD method ($Si_3N_4$) | PHPS | Excimer irradiation | 100 | 30 | 70 | 30 | Inv. |
| 9 | *1 | PHPS | Atmospheric pressure plasma treatment | 100 | 10 | 90 | 10 | Inv. |
| 10 | *1 | PHPS | UV lamp treatment | 60 | 55 | 5 | 92 | Inv. |
| 11 | — | Polysilazane 1 | Excimer irradiation | 100 | 0 | 100 | 0 | Comp. |
| 12 | Vacuum CVD method | Polysilazane 2 | Heat treatment | 100 | 0 | 100 | 0 | Comp. |
| 13 | *1 | TEOS | Heat treatment | 100 | 0 | 100 | 0 | Comp. |
| 14 | *1 | PHPS | Excimer irradiation | 100 | 100 | 0 | 100 | Comp. |
| 15 | *1 | HSQ | Excimer irradiation | 100 | 30 | 70 | 30 | Inv. |
| 16 | *1 | TEOS | Heat treatment | 100 | 30 | 70 | 30 | Inv. |
| 17 | *1 | PHPS | Excimer irradiation | 100 | 30 | 70 | 30 | Inv. |

*1: Atmospheric pressure plasma CVD method, PHPS: Perhydropolysilazane, Polysilazane 1: made bt AZ Electronic Materials, Ltd. Polysilazane 2: made by Tonen Chemical Corporation, molecular weight 600,
HSQ: Hydrogenated silsesquioxane,
TEOS: Tetraethoxysilane,
Inv.: Present invention,
Comp.: Comparative example, Further, measurement results of elastic modulus and film density of each barrier layer which composes each barrier film are summarize in Table 2.

RH). Based on a method described in JP-A No. 2005-283561, a water amount penetrated in the cell was calculated from the corroded amount of metal calcium.

TABLE 2

| | Elastic modulus (GPa) | | | Film density (g/cm$^2$) | | | Film density difference | | | |
| | | Second barrier layer | | | Second barrier layer | | (g/cm$^2$) | | | |
| Gas barrier film No. | First barrier layer: E1 | Reformed region: E2 | Non-reformed region: E3 | First barrier layer: D1 | Reformed region: D2 | Non-reformed region: D3 | D1 − D2 | D1 − D3 | D2 − D3 | Remarks |
|---|---|---|---|---|---|---|---|---|---|---|
| 1 | 30 | 20 | 15 | 2.18 | 2.00 | 1.88 | 0.18 | 0.30 | 0.12 | Inv. |
| 2 | 45 | 35 | 15 | 2.21 | 2.16 | 1.85 | 0.05 | 0.36 | 0.31 | Inv. |
| 3 | 45 | 30 | 15 | 2.21 | 2.10 | 1.89 | 0.11 | 0.32 | 0.21 | Inv. |
| 4 | 30 | 30 | 25 | 2.15 | 2.10 | 1.95 | 0.05 | 0.20 | 0.15 | Inv. |
| 5 | 50 | 30 | 25 | 2.40 | 2.10 | 1.95 | 0.30 | 0.45 | 0.15 | Inv. |
| 6 | 55 | 30 | 25 | 2.90 | 2.10 | 1.95 | 0.80 | 0.95 | 0.15 | Inv. |
| 7 | 60 | 30 | 25 | 3.20 | 2.10 | 1.95 | 1.10 | 1.25 | 0.15 | Inv. |
| 8 | 60 | 35 | 15 | 3.20 | 2.16 | 1.85 | 1.04 | 1.35 | 0.31 | Inv. |
| 9 | 30 | 15 | 10 | 2.18 | 1.95 | 1.85 | 0.23 | 0.33 | 0.10 | Inv. |
| 10 | 45 | 35 | 20 | 2.21 | 2.13 | 1.92 | 0.08 | 0.29 | 0.21 | Inv. |
| 11 | — | — | — | — | — | — | — | — | — | Comp. |
| 12 | 30 | — | 30 | 2.15 | — | 2.15 | — | 0.00 | — | Comp. |
| 13 | 30 | — | 30 | 2.18 | — | 2.18 | — | 0.00 | — | Comp. |
| 14 | 30 | 20 | — | 2.18 | 2.00 | — | 0.18 | — | — | Comp. |
| 15 | 30 | 30 | 15 | 2.18 | 2.00 | 1.85 | 0.18 | 0.33 | 0.15 | Inv. |
| 16 | 30 | 25 | 10 | 2.18 | 1.95 | 1.85 | 0.23 | 0.36 | 0.13 | Inv. |
| 17 | 30 | 30 | 15 | 2.12 | 2.12 | 1.89 | 0.00 | 0.23 | 0.23 | Inv. |

Inv.: Present invention,
Comp.: Comparative example,

<<Performance Evaluation of Gas Barrier Film>>

Each gas barrier film prepared by the above-described method was subjected to the performance evaluations according to the following methods.

[Evaluation of Water Vapor Barrier Property]

According to the following method, water vapor barrier property of each gas barrier film was evaluated.

(Apparatus)

Vapor deposition apparatus: Vacuum deposition apparatus JEE-400 made by JEOL, Ltd.

Constant temperature and humidity oven: Yamato Humidic Chamber IG 47 M

Corroded metal reacted with water: calcium (particle)

Water vapor impermeable metal: aluminium (diameter: 3 to 5 mm, particle)

(Preparation of Water Vapor Barrier Evaluation Cell)

A gas barrier layer surface of a barrier film sample is provided with a mask except on a portion of the barrier film sample which is required to be vapor deposited (9 places of 12 mm×12 mm) and metal calcium was vapor deposited thereon using a vacuum deposition apparatus (JEE-400 made by JEOL, Ltd.).

Then, the mask was removed with keeping the vacuum condition, and aluminium was deposited from another metal vapor deposition source on a whole one surface of the sheet. After sealing with aluminium, the vacuum condition was removed. Under a dry nitrogen gas atmosphere, a quartz glass having thickness of 0.2 mm was immediately faced with the aluminium sealing surface via an ultraviolet curing resin for sealing (made by Nagase ChemteX Co., Ltd.), and ultraviolet rays were irradiated to produce an evaluation cell. In order to verify the change of the gas barrier property before and after bending, the barrier film which was not subjected to the above-described bending treatment was also used to prepare air evaluation cell for water vapor barrier property.

The prepare sample having two sealed surfaces was kept under a high temperature and a high humidity (60° C., 90%

In addition, in order to check that there was no transmission of the water vapor from other portion than the barrier film side, a comparative sample was used. This comparative sample was prepared by vapor depositing metal calcium on a quartz glass plate having a thickness of 0.2 mm instead of using a barrier film sample, and a high temperature and a high humidity (60° C., 90% RH) keeping test was done in the same manner. It was confirmed that the metal calcium corrosion was not produced even after 1,000 hours.

The water content of each gas barrier film measured by the above-described method was classified according to the following 5 ranks, and water vapor barrier property was evaluated. It was determined to be acceptable for practical use when the ranking was 3 or more.

5: Water content is less than $1 \times 10^{-4}$ g/m$^2$/day.

4: Water content is $1 \times 10^{-4}$ g/m$^2$/day or more, and less than $1 \times 10^{-3}$ g/m$^2$/day.

3: Water content is $1 \times 10^{-3}$ g/m$^2$/day or more, and less than $1 \times 10^{-2}$ g/m$^2$/day.

2: Water content is $1 \times 10^{-2}$ g/m$^2$/day or more, and less than $1 \times 10^{-1}$ g/m$^2$/day.

1: Water content is $1 \times 10^{-1}$ g/m$^2$/day or more.

[Evaluation of Bending Resistance]

Each gas barrier film was subjected to 100 times repeated bending treatment at an angle of 180° to form a curvature radius of 10 mm. Then, water vapor permeability was measured in the same method as described above. By the change of water vapor permeability before and after the bending treatment, the deterioration resistance was measured, and bending resistance was evaluated according to the following 5 ranks. It was determined to be acceptable for practical use when the ranking was 3 or more.

Bending resistance degree=(Water vapor permeability after bending test/Water vapor permeability before bending test)×100

5: Bending resistance degree is 90% or more,
4: Bending resistance degree is 80% or more, and less than 90%.
3: Bending resistance degree is 60% or more, and less than 80%.
2: Bending resistance degree is 30% or more, and less than 60%.
1: Bending resistance degree is less than 30%.

[Evaluation of Cutting Process Aptitude]

After cutting each gas barrier trim with Disc cutter DC-230 (made by CADL, Ltd.) to a piece of B5 size, the edge portion of the cut piece was observed with a loupe to determine the total number of cracks. The cutting process aptitude was evaluated according to the following ranks. It was determined to be acceptable for practical use when the ranking was 3 or more.

5: No crack is observed.
4: The number of cracks is from 1 to 2.
3: The number of cracks is from 3 to 5.
2: The number of cracks is from 6 to 10.
1: The number of cracks is 11 or more.

TABLE 3

| Gas barrier film No. | Water vapor barrier property | Bending resistance degree | Cutting process aptitude | Remarks |
|---|---|---|---|---|
| 1 | 5 | 5 | 4 | Inv. |
| 2 | 5 | 4 | 5 | Inv. |
| 3 | 5 | 5 | 5 | Inv. |
| 4 | 4 | 4 | 4 | Inv. |
| 5 | 5 | 5 | 4 | Inv. |
| 6 | 4 | 5 | 4 | Inv. |
| 7 | 5 | 4 | 4 | Inv. |
| 8 | 5 | 4 | 5 | Inv. |
| 9 | 4 | 4 | 4 | Inv. |
| 10 | 3 | 4 | 3 | Inv. |
| 11 | 3 | 3 | 1 | Comp. |
| 12 | 3 | 2 | 1 | Comp. |
| 13 | 2 | 2 | 2 | Comp. |
| 14 | 4 | 2 | 1 | Comp. |
| 15 | 3 | 4 | 4 | Inv. |
| 16 | 3 | 4 | 3 | Inv. |
| 17 | 3 | 4 | 3 | Inv. |

Inv.: Present invention, Comp.: Comparative example.

As is clearly shown by the results described in Table 3, the gas barrier films 1 to 10 and 15 to 17 of the present invention are excellent in water vapor barrier property, bending resistance and cutting process aptitude compared with the comparative gas barrier films 11 to 14.

Example 2

Preparation of Electronic Device

On each of the gas barrier films 1 to 17 prepared in Example 1 was provided with a first electrode by patterning an indium tin oxide (ITO) transparent conductive film accumulated to a thickness of 150 nm (of which sheet resistance was 10Ω/□) to a width of 2 mm via a commonly used photolithographic technique and a wet etching technique. The patterned first electrode was washed via sequential steps of ultrasonic washing using a surfactant and ultra pure water and ultrasonic washing using ultra pure water, followed by drying under a nitrogen flow, and, finally, cleaned via ultraviolet/ozone cleaning.

On the transparent substrate, Baytron P4083 (produced by Starck-V TECH, Inc.) was applied and then dried to obtain a layer thickness of 30 nm, subsequently, the layer was subjected to a heat treatment at 150° C. for 30 minutes to form a hole transport layer.

After that, each substrate was carried in into a nitrogen chamber and preparation was carried out under a nitrogen atmosphere.

First, the above-mentioned substrate was heat-treated for 10 minutes at 150° C. under a nitrogen atmosphere. Then, a liquid obtained by mixing, in chlorobenzene, 3.0% by mass of 1:0.8 mixture of P3HT (produced by Plectronics, Inc.: regioregular-poly-3-hexylthiophene) and PCBM (produced by Frontier Carbon Corporation: 6,6-phenyl-$C_{61}$-butyric acid methyl ester) was prepared, and then applied onto the resulting substrate, while filtering with a filter, so that the thickness was 100 nm, followed by drying while leaving at an ambient temperature. Subsequently, a heat treatment at 150° C. for 15 minutes was conducted, whereby a photoelectric conversion layer was formed.

Next, the substrate on which the aforementioned series of function layers were formed was moved into the chamber of a vacuum evaporation apparatus, and, after the inside of the vacuum evaporation apparatus was evacuated to $1 \times 10^{-4}$ Pa or less, lithium fluoride was accumulated to a thickness of 0.6 nm at an evaporation rate of 0.01 nm/sec, and, subsequently, metallic Al was accumulated to a thickness of 100 nm at an evaporation rate of 0.2 nm/sec through shadow masks having a width of 2 mm (vacuum evaporation was conducted by orthogonally crossing the masks so that the photo receiving portion became 2×2 mm), whereby a second electrode was formed. Obtained organic photoelectric conversion element was transferred to a nitrogen chamber, and sealing was conducted according to the following sealing method. Thus, organic photoelectric conversion elements Nos. 1 to 17 each having a 2×2 mm photo receiving portion were prepared as electronic devices.

(Sealing of Organic Photoelectric Conversion Element)

Under an atmosphere purged by a nitrogen gas (an inert gas), two sheets of each of the gas barrier films 1 to 17 prepared in Example 1 were used, and a gas barrier unit was applied with an epoxy-photocurable adhesive as a sealant on the surface on which a gas barrier unit was formed. Each of the photoelectric conversion elements corresponding to the gas barrier film 1 to 17 obtained by the aforementioned method was sandwiched between the adhesive applied surfaces of the two gas barrier films 1 to 17, respectively, and tightly adhered. Then, each of them was irradiated with UV light from the substrate of one side. Thus, Organic photoelectric conversion elements 1 to 17 were prepared.

<<Evaluation of Organic Photoelectric Conversion Element>>

Durability of the prepared organic photoelectric conversion elements was evaluated by the following method.

[Evaluation of Durability]
<Energy Conversion Efficiency>

Each organic photoelectric conversion element was irradiated with light of 100 mW/cm² from a solar simulator (AM 1.5G filter). By evaluating an I-V property while placing a mask having an effective area of 4.0 mm² on the photo receiving portion, a short circuit current density Jsc (mA/cm², an open circuit voltage Voc (V) and a fill factor FF (%) were determined to evaluate the energy conversion efficiency PCE (%) calculated according to following Formula 1 for each of the four photo receiving portions formed on the same element. Then, an average of the above four energy conversion efficiencies was obtained.

$$PCE\ (\%) = [Jsc\ (mA/cm^2) \times Voc\ (V) \times FF\ (\%)]/100\ mW/cm^2 \quad \text{Formula 1}$$

The energy conversion efficiency as an initial cell property was measured, and then the degree of time degradation of the property was evaluated from the residual ratio of the energy conversion efficiency after an enforced degradation test in which the element was stored at 60° C. under 90% RH for 1000 hours.

Residual ratio of energy conversion efficiency=(Energy conversion efficiency after accelerated test/Initial energy conversion efficiency)×100

5: Residual ratio of energy conversion efficiency is 90% or more
4: Residual ratio of energy conversion efficiency is 70% or more, and less than 90%
3: Residual ratio of energy conversion efficiency is 40% or more, and less than 70%
2: Residual ratio of energy conversion efficiency is 20% or more, and less than 40%
1: Residual ratio of energy conversion efficiency is less than 20%

The obtained results are shown in Table 4.

TABLE 4

| Organic photoelectric conversion element No. | Gas barrier film No. | Durability | Remarks |
| --- | --- | --- | --- |
| 1 | 1 | 5 | Inv |
| 2 | 2 | 5 | Inv. |
| 3 | 3 | 5 | Inv. |
| 4 | 4 | 5 | Inv. |
| 5 | 5 | 5 | Inv. |
| 6 | 6 | 4 | Inv. |
| 7 | 7 | 4 | Inv. |
| 8 | 8 | 5 | Inv. |
| 9 | 9 | 5 | Inv. |
| 10 | 10 | 5 | Inv. |
| 11 | 11 | 2 | Inv. |
| 12 | 12 | 1 | Comp. |
| 13 | 13 | 2 | Comp. |
| 14 | 14 | 2 | Comp. |
| 15 | 15 | 3 | Inv. |
| 16 | 16 | 3 | Inv. |
| 17 | 17 | 3 | Inv. |

Inv.: Present invention, Comp.: Comparative example.

As is clearly shown by the results described in Table 4, an organic photoelectric conversion element prepared with a gas barrier film of the present invention is hardly deteriorated in performance even under the severe atmosphere compared with a comparative organic photoelectric conversion element.

DESCRIPTION OF SYMBOLS

1: Gas barrier film
2: Substrate
3: First barrier layer
4: Second barrier layer
4A: Reformed region
4B: Non-reformed region
5: Gas barrier layer unit
L: Reforming treatment means
10: Organic photoelectric conversion element of bulk heterojunction type
11: Substrate
12: Transparent electrode
13: Counter electrode
14: Photoelectric conversion section (bulk heterojunction layer)
14p: p layer
14i: i layer
14n: n layer
14': First photoelectric conversion section
15: Charge recombination layer
16: Second photoelectric conversion section
17: Hole transport layer
18: Electron transport layer
101: Vacuum plasma CVD apparatus usable in the present invention
102: Vacuum chamber
103: Cathode electrode
105: Susceptor
106: Heat medium circulating system
107: Vacuum evacuation system
108: Gas introducing system
109: High frequency power source

The invention claimed is:

1. A gas barrier film comprising a substrate and a gas barrier layer unit on at least one surface of the substrate,
wherein the gas barrier layer unit contains:
a first barrier layer formed with a chemical vapor deposition method; and
a second barrier layer formed by coating a coating liquid containing a silicon compound, on the first barrier layer, followed by applying a reforming treatment thereto,
the second barrier layer has a non-reformed region at a substrate side and a reformed region at a surface side,
the silicon compound in the coating liquid is selected from the group consisting of polysilazane, hydrogenated silsesquioxane and tetraethoxysilane, and
the second barrier layer has a thickness of 60 to 300 nm.

2. The gas barrier film described in claim 1,
wherein a smooth layer is provided between the substrate and the first barrier layer,
the smooth layer having:
a pencil hardness of H or more at a side on which the first barrier layer is formed, the pencil hardness being defined in JIS K 5400; and
a maximum profile height Rt(p) in the range of 10 nm<Rt(p)<30 nm, the maximum profile height being defined in JIS B 0601.

3. The gas barrier film described in claim 2,
wherein the smooth layer contains an inorganic component in an amount of 10 mass % or more based on the total weight of the smooth layer.

4. The gas barrier film described in claim 2, wherein the smooth layer has a layer thickness of 0.1 μm-10 μm.

5. The gas barrier film described in claim 2, wherein the smooth layer contains an acrylate compound.

6. The gas barrier film described in claim 2, wherein the smooth layer contains a reactive silica particle.

7. The gas barrier film described in claim 1,
wherein the first barrier layer formed with a chemical vapor deposition method contains silicon oxide, silicon oxynitride, or silicon nitride.

8. The gas barrier film described in claim 1,
wherein the silicon compound is polysilazane.

9. The gas barrier film described in claim 1,
wherein a thickness of the reformed region which is located at a surface side of the second barrier layer is 0.2 to 0.9 in a thickness ratio based on the total thickness of the second barrier layer.

10. The gas barrier film described in claim 1,
wherein the first barrier layer formed with a chemical vapor deposition method contains silicon oxide or silicon oxynitride; and elastic moduli satisfy the relationship of: E1>E2>E3, when E1 is an elastic modulus of the first barrier layer, E2 is an elastic modulus of the reformed region in the second barrier layer, and E3 is an elastic modulus of the non-reformed region in the second barrier layer.

11. The gas barrier film described in claim 1,
wherein film densities satisfy the relationship of: D1>D2>D3, when D1 is a film density of the first barrier layer, D2 is a film density of the reformed region in the second barrier layer, and D3 a film density of the non-reformed region in the second barrier layer.

12. The gas barrier film described in claim 11,
wherein a film density difference (D1−D2) of the film density D1 and the film density D2 is from 0.05 to 1.30;
a film density difference (D1−D3) of the film density D1 and the film density D3 is from 0.15 to 1.40; and
a film density difference (D2−D3) of the film density D2 and the film density D3 is 0.10 or more.

13. The gas barrier film described in claim 1,
wherein the first barrier layer contains silicon oxide or silicon oxynitride and has a thickness of 50 nm to 300 nm.

14. The gas barrier film described in claim 13,
wherein the first barrier layer has a thickness of 50 nm to 200 nm.

15. The gas barrier film described in claim 1, wherein the reforming treatment is done under a condition of an oxygen density of 0 to 5%.

16. The gas barrier film described in claim 1, wherein the reformed region contains silicon oxide or silicon oxynitride.

17. The gas barrier film described in claim 1, wherein provided that the coating liquid further comprises water, before or during the reforming treatment, the water is removed from the second barrier layer such that the second barrier layer has a water content of 0.01% or less.

18. The gas barrier film described in claim 1, wherein a surface roughness (Ra) at the surface side of the second barrier layer after subjected to the reforming treatment is 2 nm or less.

19. The gas barrier film described in claim 1, wherein a protection sheet is pasted on a side formed with the gas barrier layer when the gas barrier film is wound up in a rolled form.

20. The gas barrier film described in claim 1, wherein the substrate is a plastic film having two laminated layers made of resins.

21. The gas barrier film described in claim 1, wherein the reforming treatment is done by irradiating with a vacuum ultraviolet ray having a wavelength of 100 to 180 nm.

22. The gas barrier film described in claim 1, wherein a ratio of a thickness of the reformed region to the thickness of the second barrier layer is in a range of 0.1 to 0.8.

23. The gas barrier film described in claim 1, wherein a ratio of a thickness of the reformed region to the thickness of the second barrier layer is in a range of 0.2 to 0.8.

24. A method for forming the gas barrier film described in claim 1,
wherein the reforming treatment applied to the second barrier layer is an irradiating treatment with a vacuum ultraviolet ray having a wavelength component of 180 nm or less.

25. An electronic device using the gas barrier film described in claim 1.

* * * * *